(12) United States Patent
Pan

(10) Patent No.: US 11,877,701 B2
(45) Date of Patent: Jan. 23, 2024

(54) ANTI-TIPPING ORAL HYGIENE INSTRUMENT EXCHANGING STRUCTURE

(71) Applicant: Yun-Shan Pan, New Taipei (TW)

(72) Inventor: Yun-Shan Pan, New Taipei (TW)

(*) Notice: Subject to any disclaimer, the term of this patent is extended or adjusted under 35 U.S.C. 154(b) by 782 days.

(21) Appl. No.: 16/836,942

(22) Filed: Apr. 1, 2020

(65) Prior Publication Data

US 2020/0337503 A1    Oct. 29, 2020

(30) Foreign Application Priority Data

Apr. 26, 2019   (TW) .................................. 108114688

(51) Int. Cl.
*A47K 1/09* (2006.01)
*A46B 5/00* (2006.01)
*A61C 15/04* (2006.01)

(52) U.S. Cl.
CPC .............. *A47K 1/09* (2013.01); *A46B 5/0095* (2013.01); *A61C 15/048* (2013.01); *A46B 2200/1066* (2013.01)

(58) Field of Classification Search
CPC ... A61C 15/048; A61C 15/047; A61C 15/046; A61C 15/04; A47K 1/09; A46B 5/0095; A46B 2200/1066
See application file for complete search history.

(56) References Cited

U.S. PATENT DOCUMENTS

| | | | | |
|---|---|---|---|---|
| 1,364,367 A * | 1/1921 | Goodrich | ............. | A61C 15/046 132/323 |
| 1,417,518 A * | 5/1922 | Henerlau | ............. | A61C 15/046 132/324 |
| 1,700,690 A * | 1/1929 | Stafford | ............... | A61C 15/046 132/325 |
| 2,052,520 A * | 8/1936 | Sonnenberg | ......... | A61C 15/046 132/324 |
| 2,148,066 A * | 2/1939 | Fox | ...................... | A61C 15/046 132/324 |
| 2,516,539 A * | 7/1950 | Atols | .................... | A61C 15/046 132/326 |
| 2,784,722 A * | 3/1957 | Chamberlin | ......... | A61C 15/046 132/324 |

(Continued)

FOREIGN PATENT DOCUMENTS

KR    101401900 B1 * 6/2014

*Primary Examiner* — Devin K Barnett
(74) *Attorney, Agent, or Firm* — Leong C. Lei

(57) ABSTRACT

An anti-tipping oral hygiene instrument exchanging structure includes a handle member attachable to a base member that includes a weight element, a circular curved section formed on the weight element, a base engaging section formed on the weight element, and a plurality of placing sections formed on the base member. The circular curved section is used in combination with the weight element to prevent the handle member from tipping over. The handle member has a handle engaging portion combinable with one hygiene piece. The hygiene piece includes a mutual engaging section mountable to the handle engaging portion in order to achieve an advantage of fast replacement. The hygiene piece includes a first rod, a plurality of holed sections formed on the first rod, and a plurality of detaching sections formed on the holed sections to provide an effect of assisting the operation and use of floss.

4 Claims, 23 Drawing Sheets

(56) References Cited

U.S. PATENT DOCUMENTS

| | | | | |
|---|---|---|---|---|
| 2,837,098 A * | 6/1958 | Sorboro | A61C 15/046 | 132/324 |
| 3,472,247 A * | 10/1969 | Borsum | A61C 15/046 | 132/322 |
| 4,655,233 A * | 4/1987 | Laughlin | A61C 15/046 | D28/68 |
| 4,657,033 A * | 4/1987 | Dalton | A61C 15/046 | 132/323 |
| 5,067,503 A * | 11/1991 | Stile | A61C 15/047 | 132/324 |
| 5,094,256 A * | 3/1992 | Barth | A61C 15/00 | 132/327 |
| 5,261,430 A * | 11/1993 | Mochel | A61C 15/047 | 132/322 |
| D497,222 S * | 10/2004 | Ochs | | D28/68 |
| 7,392,810 B2 * | 7/2008 | Apotheker | A61C 15/048 | 132/322 |
| 8,590,546 B2 * | 11/2013 | Pruett | A61C 15/047 | 132/322 |
| 2004/0035439 A1 * | 2/2004 | Lai | A61C 15/047 | 132/322 |
| 2004/0079384 A1 * | 4/2004 | Lai | A61C 15/048 | 132/322 |
| 2004/0129580 A1 * | 7/2004 | Cochran | A47K 1/09 | 206/361 |
| 2005/0076933 A1 * | 4/2005 | Getgey | A61C 15/047 | 132/322 |
| 2005/0205107 A1 * | 9/2005 | Ochs | A61C 15/048 | 132/323 |
| 2005/0286967 A1 * | 12/2005 | Blauzdys | A46B 5/0095 | 401/184 |
| 2006/0042650 A1 * | 3/2006 | Ochs | A61C 15/046 | 132/323 |
| 2006/0054180 A1 * | 3/2006 | Getgey | A61C 15/048 | 132/322 |
| 2007/0039109 A1 * | 2/2007 | Nanda | A46B 15/0097 | 15/105 |
| 2008/0066776 A1 * | 3/2008 | Chodorow | A61C 15/046 | 132/329 |
| 2009/0293212 A1 * | 12/2009 | Junkins | A61C 17/3454 | 132/327 |
| 2009/0301514 A1 * | 12/2009 | Passafaro | A61C 15/046 | 132/326 |
| 2009/0321374 A1 * | 12/2009 | Carr | A47K 1/09 | 211/65 |
| 2010/0071716 A1 * | 3/2010 | Rivera | A61C 15/046 | 132/323 |
| 2010/0139689 A1 * | 6/2010 | Couch | A61C 15/047 | 132/325 |
| 2012/0021382 A1 * | 1/2012 | Dickie | A61C 17/222 | 132/309 |
| 2012/0180809 A1 * | 7/2012 | Bai | A61C 15/046 | 132/327 |
| 2013/0160790 A1 * | 6/2013 | Yap | A61C 15/048 | 132/327 |
| 2013/0239986 A1 * | 9/2013 | Pruett | A61C 15/047 | 132/309 |
| 2014/0144461 A1 * | 5/2014 | Chiang | A61C 15/046 | 132/323 |
| 2014/0252925 A1 * | 9/2014 | Tooma | A47K 1/09 | 312/207 |
| 2014/0366903 A1 * | 12/2014 | Chun | A61C 15/046 | 132/200 |
| 2015/0096587 A1 * | 4/2015 | Cai | A61C 15/046 | 132/309 |
| 2015/0289635 A1 * | 10/2015 | Erskine-Smith | A61C 17/222 | 15/143.1 |
| 2016/0120373 A1 * | 5/2016 | Strong | B65D 51/249 | 248/146 |
| 2016/0166365 A1 * | 6/2016 | Ninh | A61C 15/048 | 132/309 |
| 2017/0215573 A1 * | 8/2017 | Phillips | A46B 9/04 | |
| 2019/0175318 A1 * | 6/2019 | Oh | A61C 15/043 | |
| 2019/0183291 A1 * | 6/2019 | Nguyen | A47K 1/09 | |
| 2019/0209277 A1 * | 7/2019 | To | A46B 15/0055 | |
| 2019/0358005 A1 * | 11/2019 | Filsouf | A61C 15/046 | |
| 2020/0030066 A1 * | 1/2020 | To | A46B 15/0069 | |
| 2021/0236679 A1 * | 8/2021 | Gonzalez | A61L 2/20 | |
| 2022/0087798 A1 * | 3/2022 | Ritz | A46B 13/02 | |
| 2022/0125563 A1 * | 4/2022 | Snyder | A46B 9/026 | |
| 2022/0218453 A1 * | 7/2022 | Ma | A61C 15/045 | |

* cited by examiner

ANTI-TIPPING ORAL HYGIENE INSTRUMENT EXCHANGING STRUCTURE

TECHNICAL FIELD OF THE INVENTION

The present invention relates generally to an anti-tipping oral hygiene instrument exchanging structure, and more particularly to an anti-tipping oral hygiene instrument exchanging structure that improves hygiene, eases exchanging, reduces cost, and is eco-friendly.

DESCRIPTION OF THE PRIOR ART

Foodstuff is all-important to people and is an essential concern for living. Having good and health foodstuff would ensure health of human bodies. Appetite of human beings is commonly affected by oral problems or diseases and consequently, the body health would be negatively affected. For example, periodontal disease is quite common in the modern society.

Thus, oral care and health is important and also essential to each individual. One of the easiest and most common ways of oral health care is tooth brushing. Brushing teeth every day is generally a habit for most people. In fact, dentists are suggesting teeth should be brushed at least twice every day. Correctly brushing teeth is an effect way of preventing periodontal disease. An essential factor of toothbrushing is toothbrushes. Various types of toothbrush are available, including toothbrushes having regular heads (which are further classified as large sizes, small sizes, hard bristles, and soft bristles), single-cluster toothbrushes that enable easy brushing of the rear-side teeth, interdental brushes of various sizes and shapes, and automatic toothbrushes that perform tooth brushing through vibration. For all the types of toothbrush, the bristles undergo aging through shape changing and bristle splitting. The toothbrushes must be periodically replaced by new ones. Interdental brushes are commonly replaced every 3-7 days, and regular toothbrushes must be changed every 2-3 months. The reasons are that the toothbrush, after being used, would be long time in a wet condition and the toothbrush is often kept in a humid environment, such as a bathroom. Bacteria could fast grow and breed in such a condition, leading to negative influence on human body health.

On the other hand, most of the toothbrushes are not devised with an ergonomic handle or grip, and most people would not be capable of properly holding the handle in brushing and cleaning gingival sulcus. This often leads to potential risk of periodontal disease. To make an ergonomic toothbrush handle, twice of the material that is used in making a regular toothbrush handle would be required. This increases the cost and lowers consumers' desire of purchase, and is also not friendly to the natural environment. Further, as toothbrushes should not be used for a long time and they are not provided any function of replacement. The toothbrushes that are currently available are generally of a single function and must be disposed of after being used for a predetermined period of time or after being damaged. This causes a waste to the consumers and is also harmful to the natural environment.

SUMMARY OF THE INVENTION

An objective of the present invention is that a placing section is provided for receiving and placing a hygiene instrument and a base member is provided to prevent the hygiene instrument from tipping over in order to improve hygiene effect.

Another objective of the present invention is that holed sections and detaching sections are provided to allow a user to easily fit fossil among rear-side teeth so as to improve easiness of use and enhance oral hygiene.

To achieve the above objectives, the present invention provides an oral hygiene instrument, of which a main structure comprises: a handle member, a base that comprises a weight element, a circular curved section formed on the weight element, and a base engaging section formed on the weight element, a handle engaging portion formed on the handle member, a plurality of hygiene pieces engageable with and combinable with the handle engaging portion, a plurality of mutual engaging sections provided on the hygiene pieces, and a plurality of placing sections defined on the base member, wherein one of the hygiene pieces includes a first rod, a plurality of holed sections formed on the first rod, and a plurality of detaching sections formed on the holed sections.

With the above structure, a user may efficiently mount each of the hygiene pieces individually to the handle engaging portion by means of the mutual engaging section and is allowed to change or replace different hygiene pieces according to the condition of use. To use, the handle member that is made ergonomically can be held and gripped and the hygiene piece can be used to conduct a cleaning operation in an oral cavity. After use, the handle member is efficiently placed back to the base engaging section and each of the hygiene pieces that are exchangeable is placed in the respective placing section. Under this condition, the center of weight of the oral hygiene instrument is continuously kept in the interior of the weight element and is guided by the circular curved section so that the handle member and the hygiene pieces are constantly kept in an erected and standing condition, without easily contacting other objects, and can be stored in an organized manner to enhance outside aesthetics. Further, the oral hygiene instrument can be placed at any desired location to for example improve an effect of air drying. The user may quickly disassemble and assemble the mutual engaging section and the handle engaging portion to achieve a function of quickly replacing the hygiene pieces. When the handle member or the hygiene pieces are damaged, it is possible to remove and change it individually to achieve an advantage of saving cost and environmental protection.

A regular person often uses a floss pick to cleaning the interdental gap of the rear-side teeth and the dentists strongly discourage so. Floss should not be directly removed from the occlusal surfaces of the teeth and should be withdrawn sideways in order to remove food residue and dental bacterial plaque sideways. However, since general users are incapable of dexterously operating and using floss, they use floss picks instead, and this may potentially lead to a condition of not preventing and not improving dental diseases. To enable a user to easily use floss, this invention allows the floss to be inserted into the holed sections by way of the detaching sections and using the handle member to operate and control the first rod, so as to steadily and precisely move the first rod to have the floss aligning a location between the teeth on a rear side of the oral cavity and subsequently, the detaching sections are used to allow the floss to separate from the holed sections, allowing the user to quickly and easily place the floss between teeth on the rear side teeth to enhance efficiency and easiness of use.

Through the technology described above, breakthroughs are made in respect of the drawbacks that an existing toothbrush provides no improved effect of hygiene and allows no exchange or replacement of a toothbrush head to thereby increase cost and make no help to environmental protection, to achieve improvement in respect of utilization with the present invention.

DETAILED DESCRIPTION OF THE PREFERRED EMBODIMENT

Figure 1:
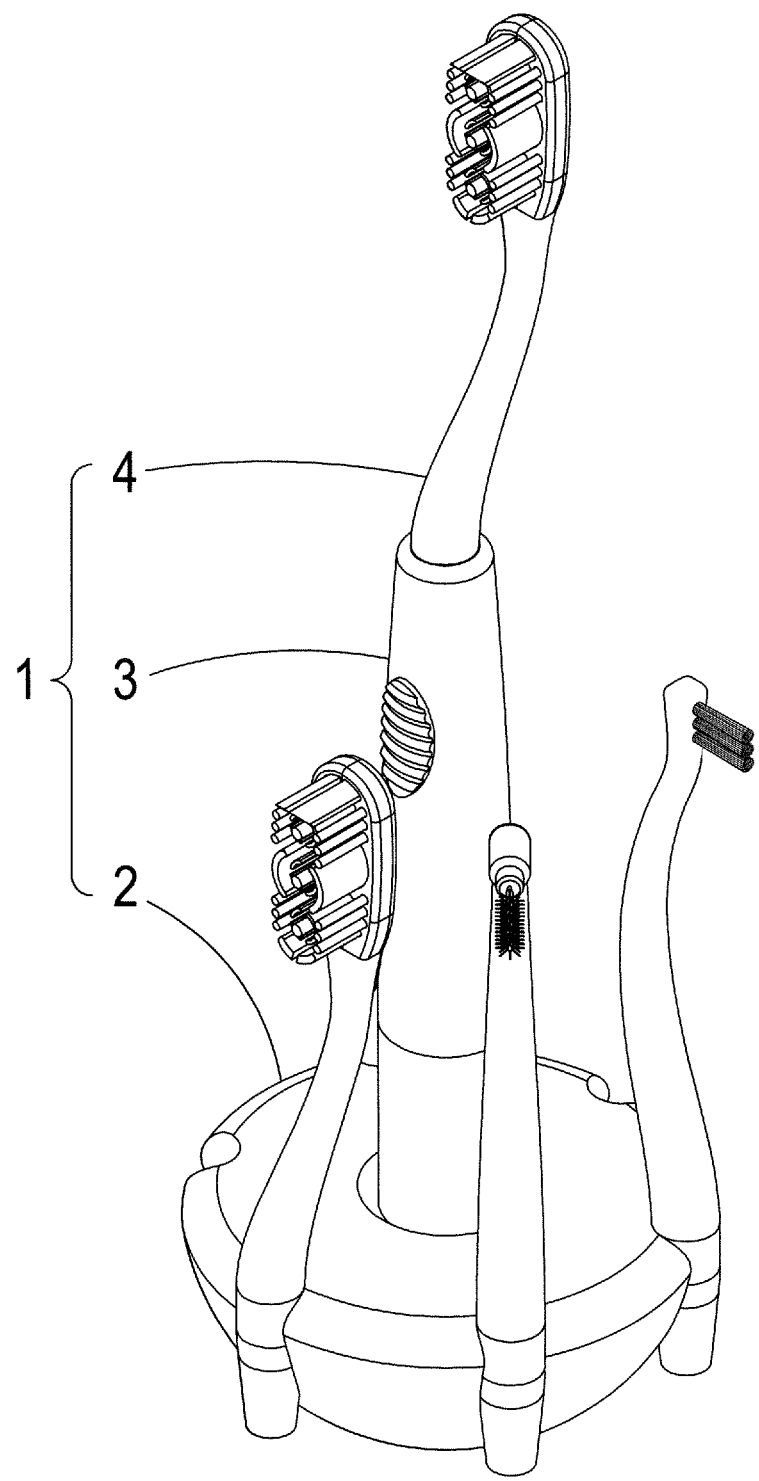
FIG. 1 is a perspective view showing a first embodiment the present invention.
Figure 2:
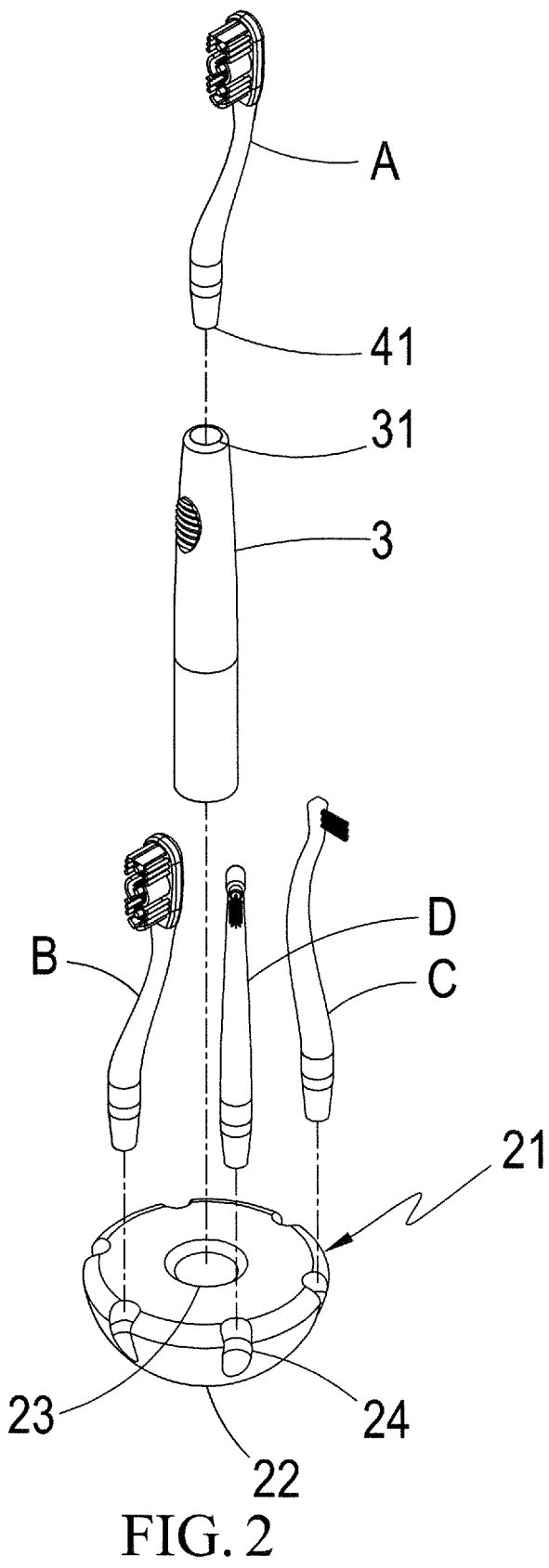
FIG. 2 is an exploded view showing the first embodiment of the present invention.
Figure 3:
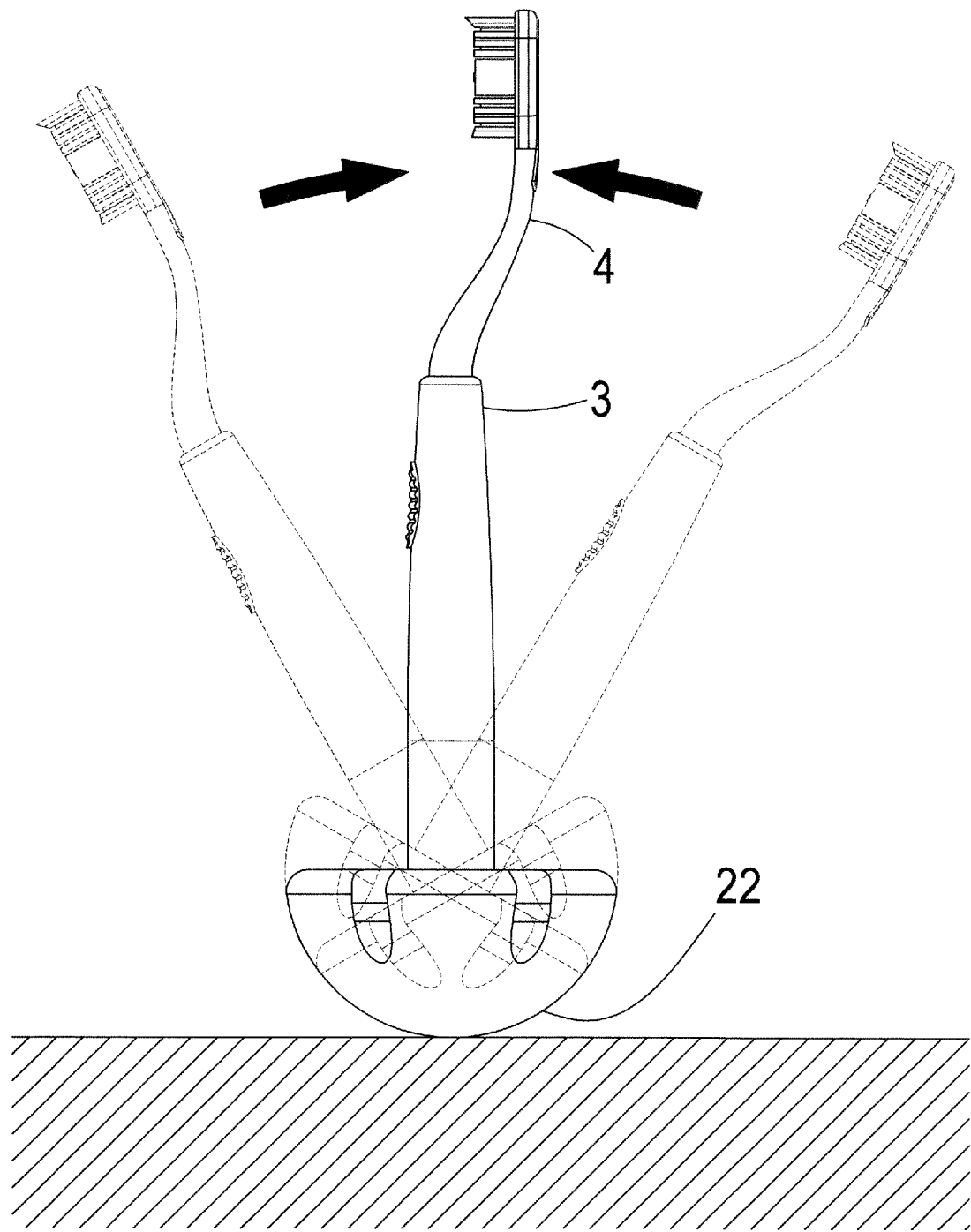
FIG. 3 is a schematic view demonstrating anti-tipping feature of the present invention.
Figure 4:
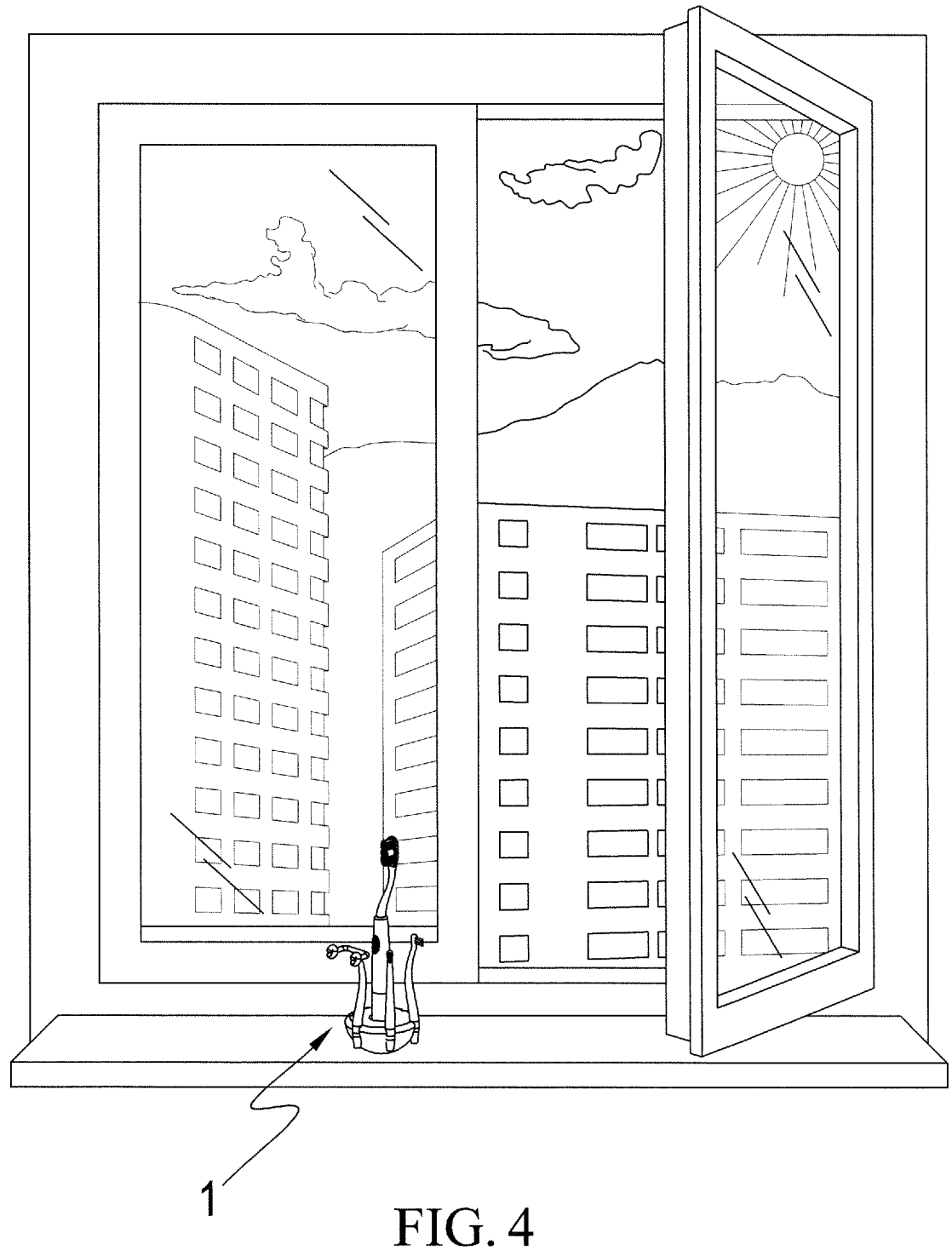
FIG. 4 is a schematic view demonstrating placing of the first embodiment of the present invention.
Figure 5:
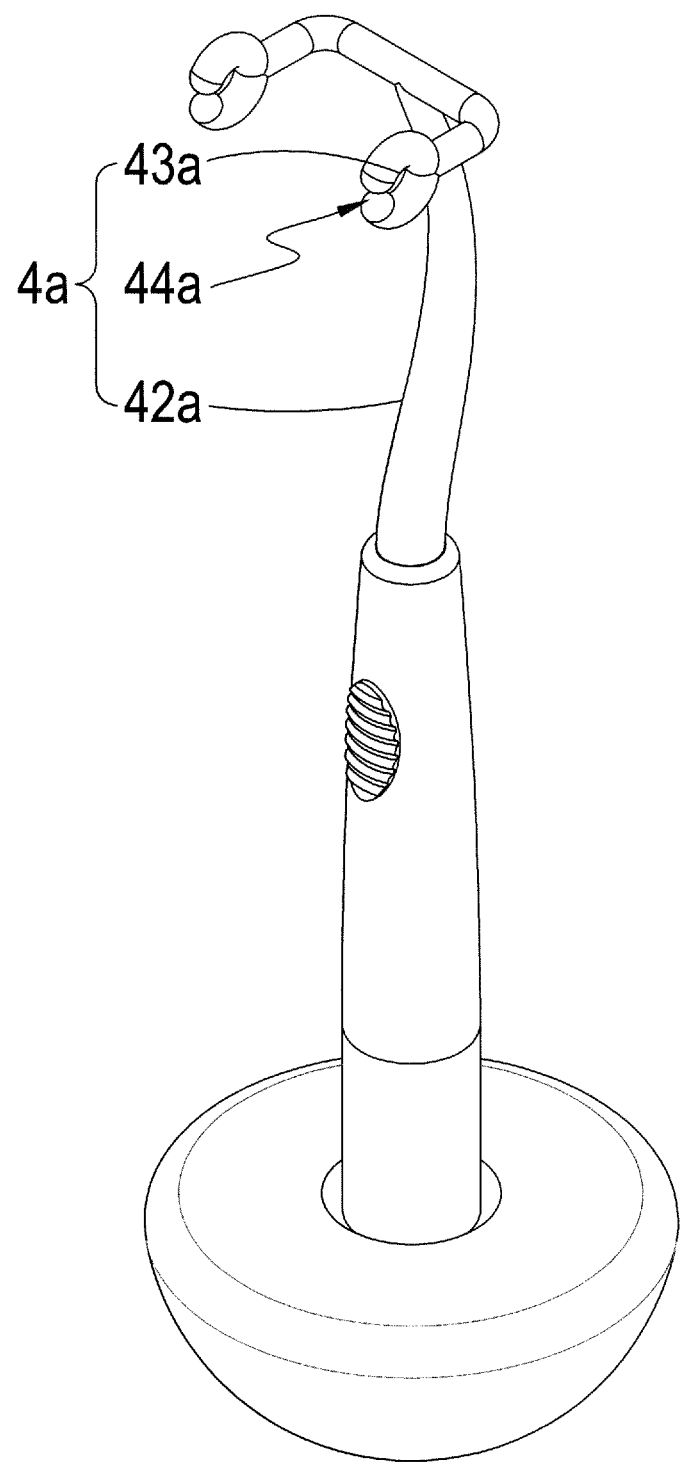
FIG. 5 is a perspective view showing a second embodiment the present invention.
Figure 6:
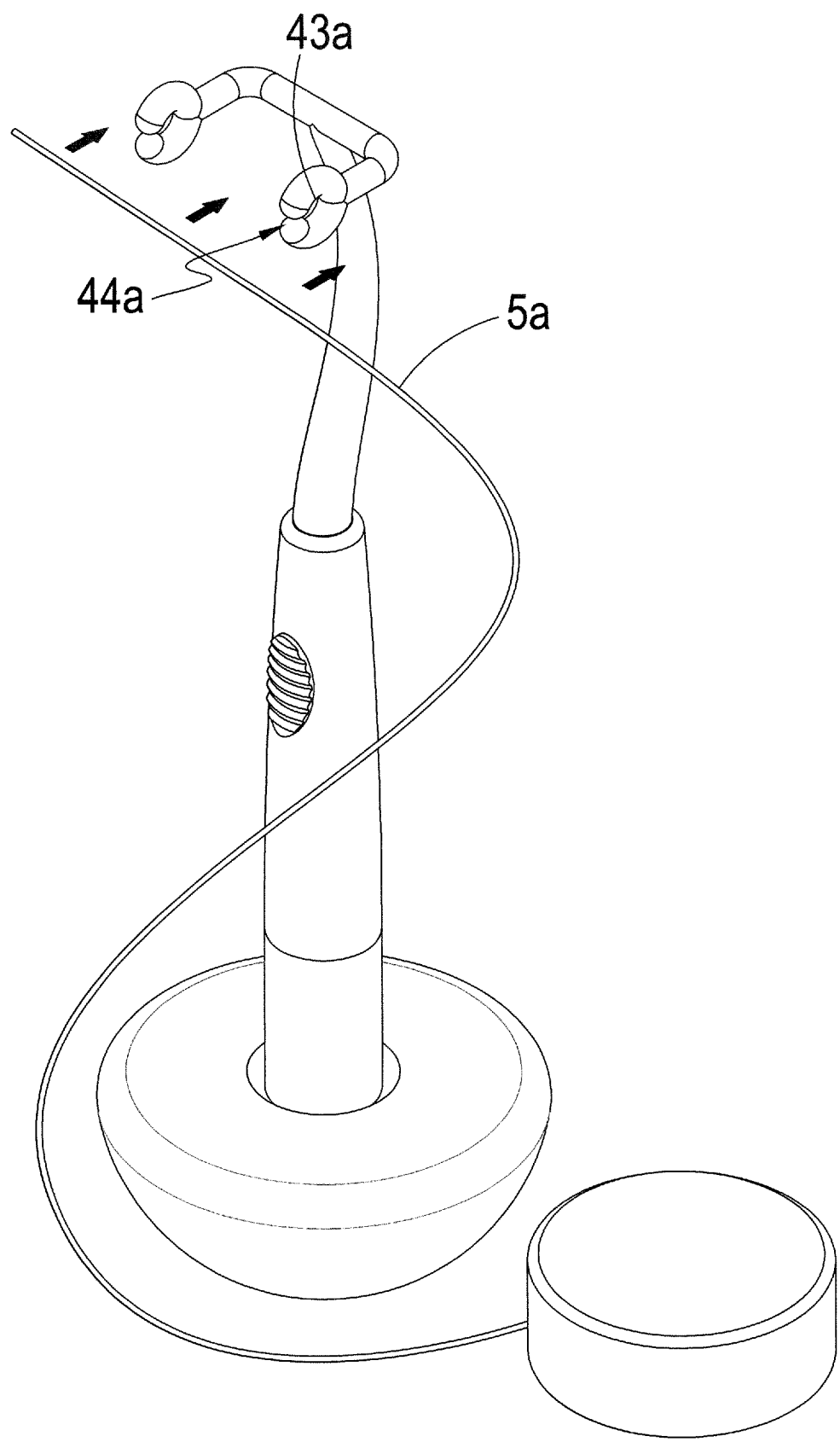
FIG. 6 is a schematic view demonstrating inserting of the second embodiment of the present invention.
Figure 7:
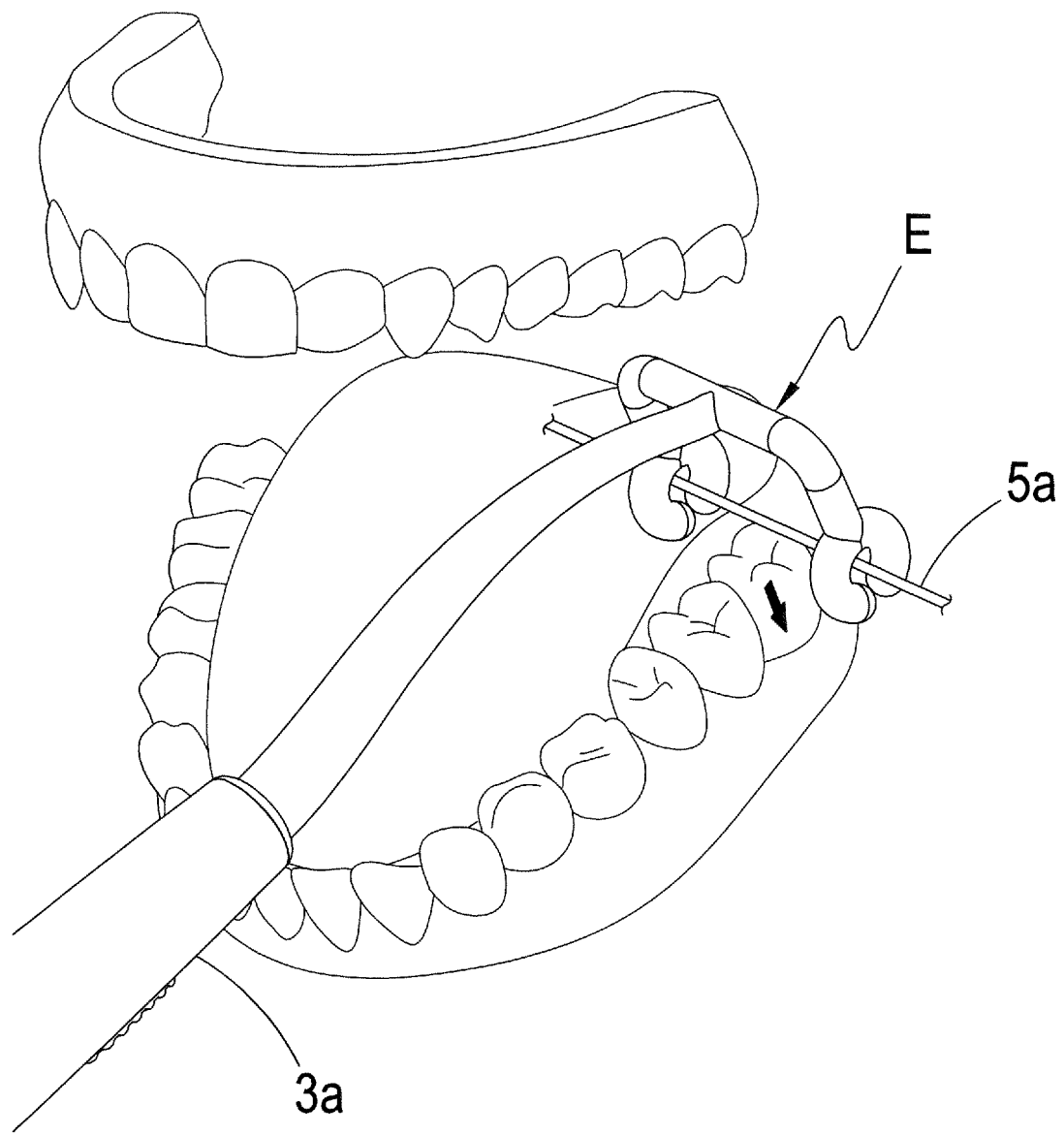
FIG. 7 is a schematic view demonstrating fitting of the second embodiment of the present invention.
Figure 8:
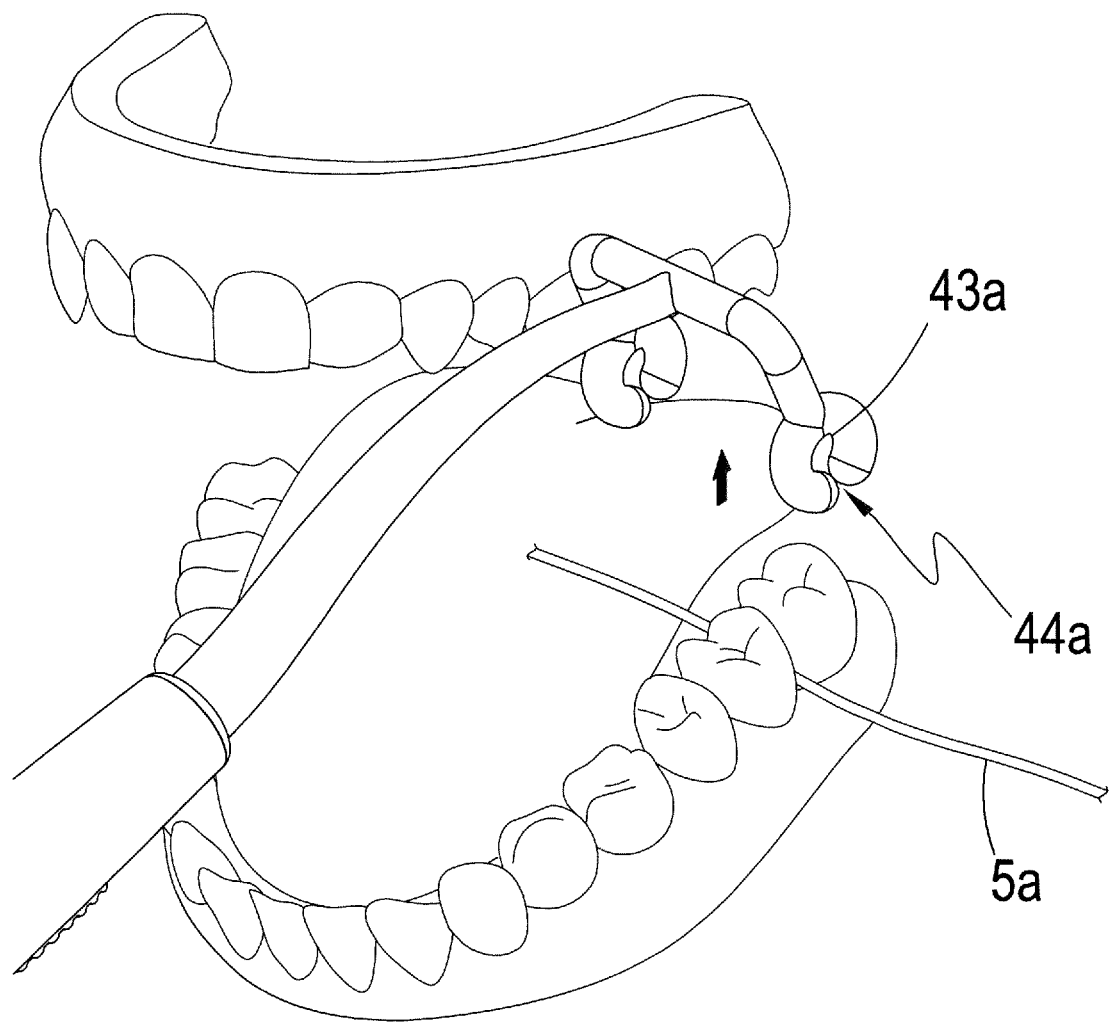
FIG. 8 is a schematic view demonstrating detaching of the second embodiment of the present invention.
Figure 8A:
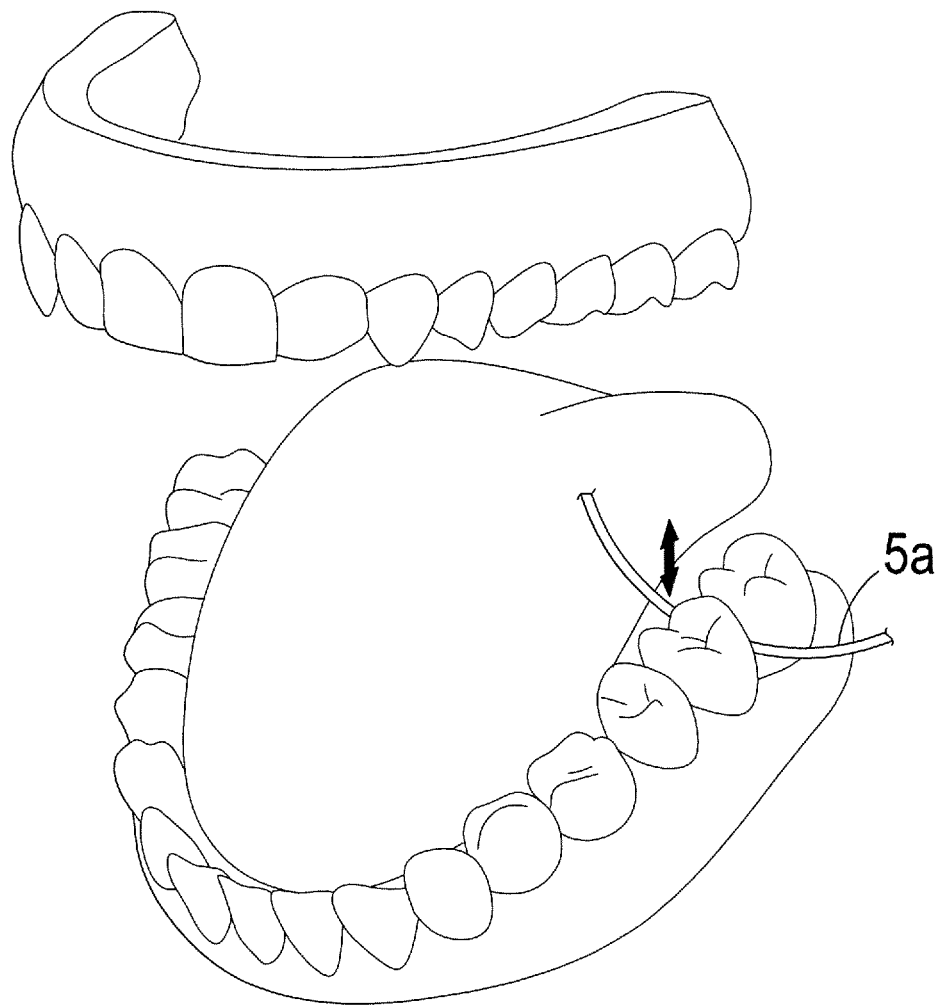
FIG. 8A is a schematic view demonstrating scraping of the second embodiment of the present invention.
Figure 9:
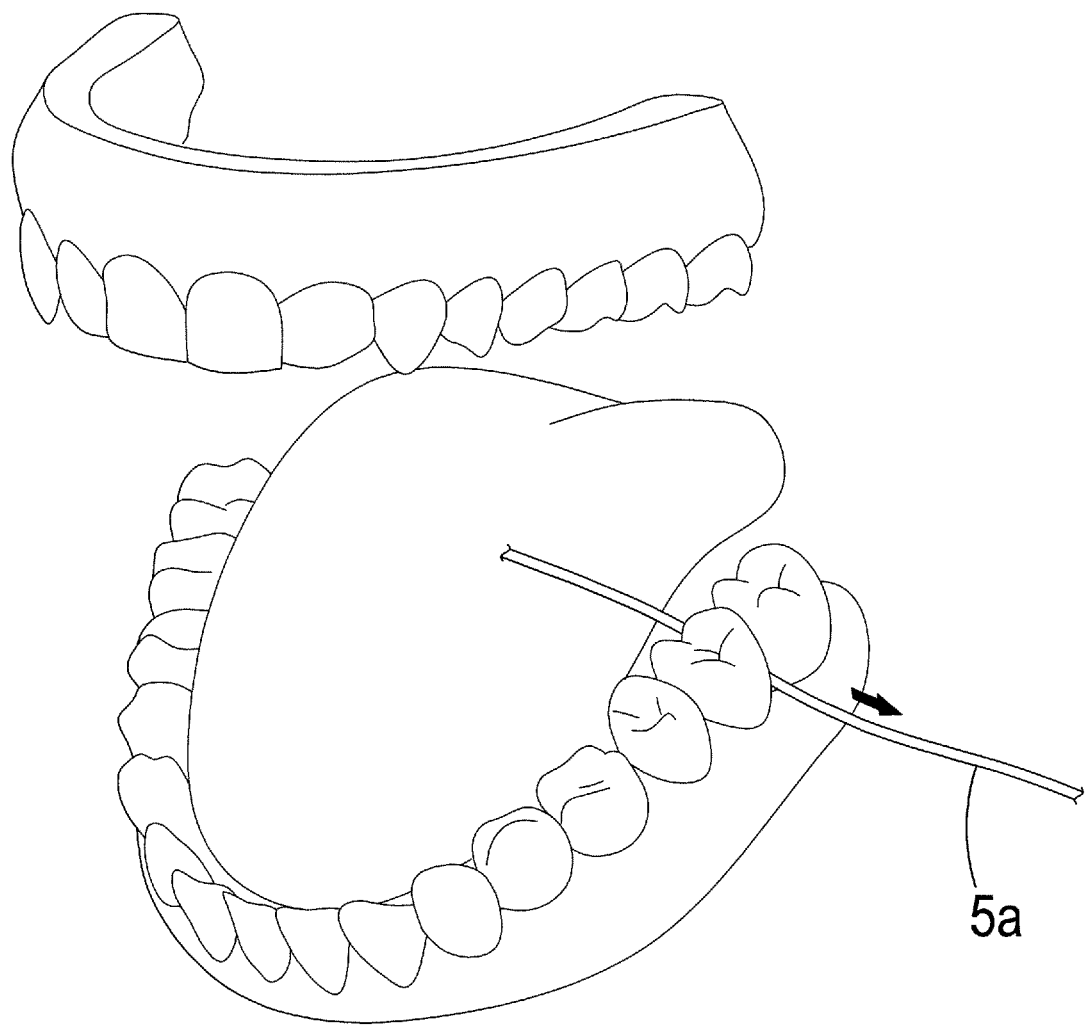
FIG. 9 is a schematic view demonstrating withdrawing of the second embodiment of the present invention.

Referring to FIGS. 1 and 2, which are respectively a perspective view and an exploded view of the first embodiment of the present invention, it can be seen from the drawings that an oral hygiene instrument 1 according to the present invention comprises:

a handle member 3, the handle member 3 being illustrated, as an example of the instant embodiment, as a plastics-made handle, but being not limited thereto as being alternatively made of wood, ceramics, or metal;

a base member 2 for placing the handle member 3, the base member 2 including a weight element 21, a circular curved section 22 that is formed on the weight element 21, a base engaging section 23 that is formed on the weight element 21 and is located at one side that is opposite to the circular curved section 22, the base member 2 having a weight that is greater than a weight of the handle member 3, the base member 2 being illustrated, as an example of the instant embodiment, as a plastics-made base, but being not limited thereto as being alternatively made of wood, ceramics, or metal, the base engaging section 23 being illustrated, as an example, as a recessed formed in the weight element 21;

a handle engaging portion 31 formed on the handle member 3, the handle engaging portion 31 being illustrated, as an example of the instant embodiment, as a hole formed in the handle member 3;

a plurality of hygiene pieces 4 correspondingly engageable with and attachable to the handle engaging portion 31, the hygiene pieces 4 being not subjected to any constraint and limitation and being illustratively one of a soft-bristle toothbrush A, a hard-bristle toothbrush B, a single-cluster toothbrush C, and an interdental brush D, the hygiene pieces 4 being illustrated, in the instant embodiment, as being made of a material that is eco-friendly and is decomposable;

a plurality of mutual engaging sections 41 formed on the hygiene pieces 4, the mutual engaging sections 41 being illustrated, as an example of the instant embodiment, as engaging sections formed on ends of the hygiene pieces 4 to allow individual ones of the hygiene pieces 4 to engage and thus attach to the handle engaging portion 31 by means of the mutual engaging section in a tight fitting manner; and a plurality of placing sections 24 formed on the base member 2, each of the placing sections 24 being provided to receive and position one of the hygiene pieces 4, the placing section 24 being illustrated, as an example of the instant embodiment, as recesses formed in the base member 2.

The above description provides explanation of the structure of the present invention. Based on a structure, advantages of easy replacement, cost saving, and enhancing oral hygiene can be achieved. A more detailed explanation will be provided below.

Referring to FIGS. 1-4, which are respectively a perspective view and an exploded view of the first embodiment of the present invention and schematic views demonstrating anti-tipping and placing of the first embodiment of the present invention, during assembling and combining the above-discussed components/parts, it can be seen from the drawings that a user may use the mutual engaging section 41 to insert and attach the hygiene piece 4 to the handle engaging portion 31 in a tight fitting manner and may use the handle member 3 to control and operate the hygiene piece 4 to perform a cleaning operation to teeth in an oral cavity, and may, based on situations or different users, exchange and replace with different ones of the hygiene pieces 4. The handle member 3 can designed as an ergonomic handle. Since there is no need to replace or exchange the handle member 3, during use, the ergonomic handle member 3 can be used to control the hygiene pieces 4 to make the use easier, allowing the user to easily clean the rear-side teeth. In the instant embodiment, a soft-bristle toothbrush A, a hard-bristle toothbrush B, a single-cluster toothbrush C, and an interdental brush D are provided as examples. A user may use the mutual engaging section 41 and the handle engaging portion 31 to achieve an effect of fast insertion and removal in order to exchange or replace the hygiene pieces 4 of any types, realizing an advantage of fast mounting/dismounting and easy replacement/exchange. By allowing a user to easily change the hygiene pieces 4 to any desired type, it would ensure an effect of effectively cleaning the soft and hard tissues/organization of the mouth as desired. Since the condition of the oral organization of a healthy user may be different from that of a patient of tooth diseases or disorders, such as increased interdental gaps, exposed tooth root, and skewing of rear-side tooth, beside tooth reconstruction, an important way to handle tooth diseases is to correctly and effectively cleaning all soft and hard tissues of the oral cavity on which dental bacterial plaque may attach to causes diseases, such as tooth decay and periodontal disease. Thus, it may need all sorts of brush head for cleaning all sorts of soft and hard tissues inside the oral cavity. For example, a regular toothbrush may be used to clean a tooth surface; a single-cluster toothbrush C may be used to clear the rear-side teeth that are located extremely close to cheeks; an interdental brush D may be used to clean a triangular gap between two teeth resulting from lowering of bone; and a piece of floss may be used to clean dental bacterial plaque between teeth and the floss may be withdrawal sideways to bring out food residues. Through the way of fast mounting/dismounting provided above, there is no need to additionally purchases different sorts of oral hygiene/cleaning instruments, for it only needs to exchange hygiene pieces 4 to achieve various effects of hygiene and cleaning.

After use, the base member 2 can be used to position the handle member 3, and all the exchangeable hygiene pieces 4 can be positioned, with the bristled part pointing upwards, in the placing section 24 to set all the hygiene pieces 4 in an erected condition. Since the weight element 21 makes an overall center of weight continuously concentrated on a center of a lower portion, any hit or inclined positioning would be corrected by the circular curved section 22 to have the center of the lower portion re-align and point to exactly a lower side, achieving an effect of roly-poly toy. As such, the hygiene pieces 4 would not easily contact other articles and can be placed at any desired location. Being positioned in a non-ventilating site for just one day, the hygiene pieces 4 may get even dirtier than those that are set in an erected condition in an air-drying site for three weeks, and as such, placing the oral hygiene instrument 1 at a location close to a window or other ventilating location, a complete air-dried space could be created to prevent growth and breeding of bacteria resulting from high humidity and thereby greatly improving hygiene.

Further, a toothbrush, after being used for a period of time, would generate a lot of bacteria and experiments prove the number of bacteria is even greater than those of a toilet. Thus, dentists suggest toothbrushes must be replaced for use of two months. The structure of the mutual engaging section 41 and the handle engaging portion 31 as discussed above would allow a user to just replace or change the hygiene pieces 4, but not the handle member 3. Also, the handle member 3 can be separated from the base member 2, so that when any of the handle member 3, the hygiene pieces 4, and the base member 2 is damaged, they can be replaced individually and there is no need to replace or change the entire set of the device, and as such, an advantage of saving cost is achieved. Further, in most cases, only the hygiene pieces 4 need to be replaced or changed, while the handle member 3 can be repeatedly used, so that, in the instant embodiment, the hygiene pieces 4 are made of an eco-friendly decomposable material and as such, no undegradable plastic trash will be made and an effect of eco-friendliness is achieved.

Since the hygiene pieces 4 that are exchangeable or replaceable provide an effect of saving cost and could be replaced more frequently, an advantage of lowering the potential risk of infection and thus lowering the potential risk of diseases, improving the body healthy of the consumers, reducing the cost of medical care. For a continuous period of use for more than three weeks, the number of bacteria on the bristles is around 80 to 90 times of those on a toilet bowl, and as such, the exchangeability or replaceability of the hygiene pieces 4 allows the public to frequently change the bristled parts, keeping the toothbrushes clean, and also, with the tumbler effect of the base member 2, the hygiene pieces 4 can be always kept in a dried condition, helping reducing the number of bacteria, and this could be of great help to disease prevention and ensures a positive influence on the health of the public.

Referring further to FIGS. 5-9, which are respectively a perspective view showing a second embodiment the present invention, a schematic view demonstrating inserting of the second embodiment of the present invention, a schematic view demonstrating fitting of the second embodiment of the present invention, a schematic view demonstrating detaching of the second embodiment of the present invention, a schematic view demonstrating scraping of the second embodiment of the present invention, and a schematic view demonstrating withdrawing of the second embodiment of the present invention, it can be clearly seen from the drawings, the instant embodiment is generally similar to the previous embodiments, except that in the instant embodiment, the hygiene pieces 4a includes a first rod 42a, a plurality of holed sections 43a formed on the first rod 42a, and a plurality of detaching sections 44a formed on the holed sections 43a, wherein the holed sections 43a are illustrated, as an example, as two circular holes extended from the first rod 42a, and the detaching sections 44a are illustrated, as an example, as notches or openings formed in a circumference or a sidewall of the circular hole, this allowing the hygiene piece 4a to function as a floss insertion assisting device E.

A user first insert a piece of floss 5a through the detaching sections 44a into the holed sections 43 and uses the handle member 3a to control the hygiene piece 4a in order to fit the floss 5a between teeth, and then uses the detaching sections 44a to separate the floss insertion assisting device E from the floss 5a, so that, in this way, the user is allowed to move the floss 5a back and forth between teeth for cleaning to scrape and remove dental bacterial plaque and any foreign objects between the teeth, and after cleaning, the user releases one end of the floss 5a and applies a force to an opposite end to directly withdraw the floss 5a from the gap between the teeth, but not to withdraw through moving upward from the gap between the teeth. In this way, the effect of cleaning that the floss 5a may achieve is better than that provided with a floss pick and would leave any contamination residue in the gap between teeth in a way that a floss pick may do, and further, since the floss 5a is withdrawn sideways, there is no concern that a floss pick might undesirably loosen prosthesis and dental restoration and dentures. Since the present invention is a dentist, who notices many patients of periodontal disease and tooth decay, and regular people, are not aware how to use floss 5a properly and eventually choose a floss pick, which leads to easy generation of periodontal disease and tooth decay, and eventually deriving severe dental diseases, making it necessary to treat the teeth with a great expense. Thus, dentists suggest the patients to use floss $5a$ to remove dental bacterial plaque between teeth, and a correct way of cleaning with the floss $5a$ is to fit the floss $5a$ into the gap between teeth and moving the floss $5a$ to scrape dental bacterial plaque from the sidewalls of the teeth, and finally withdrawing the floss $5a$ from the teeth in a sideway direction to bring out all the dirt and food residue from the inside. However, it is generally hard for a user to fit the floss $5a$ (not a floss pick) into the rear-side teeth, and as such, a floss pick will be used instead for easy use and operation, but as noted above, a floss pick does not provide the same effect as the floss $5a$, this being generally that when a floss pick is inserted into the interdental space, an angle that it might achieve for cleaning is constrained and in case of stuffed teeth (such as food or dirt is filled in the interdental gap), such food may be pushed or pressed in a direction toward the gum, having it deeply hiding in the gingival sulcus and when the floss pick is pulled out, if there is dental prothesis locate besides, such dental prothesis might be caused to loosen or detach. Based on this, using floss $5a$ to clean teeth is the correct way. Using the floss insertion assisting device E would allow a user to easy fit the floss $5a$ into the rear-side teeth to ensure easiness of operation and control, and withdrawing the floss $5a$ can be conducted in a sideway direction after the cleaning, so that there is no concern of loosening and detaching dental prothesis by removing a floss pick in an upward direction. In this way, the overall effect of cleaning for the oral cavity is greatly enhanced and the use of the present invention is more diversified.

Figure 10:
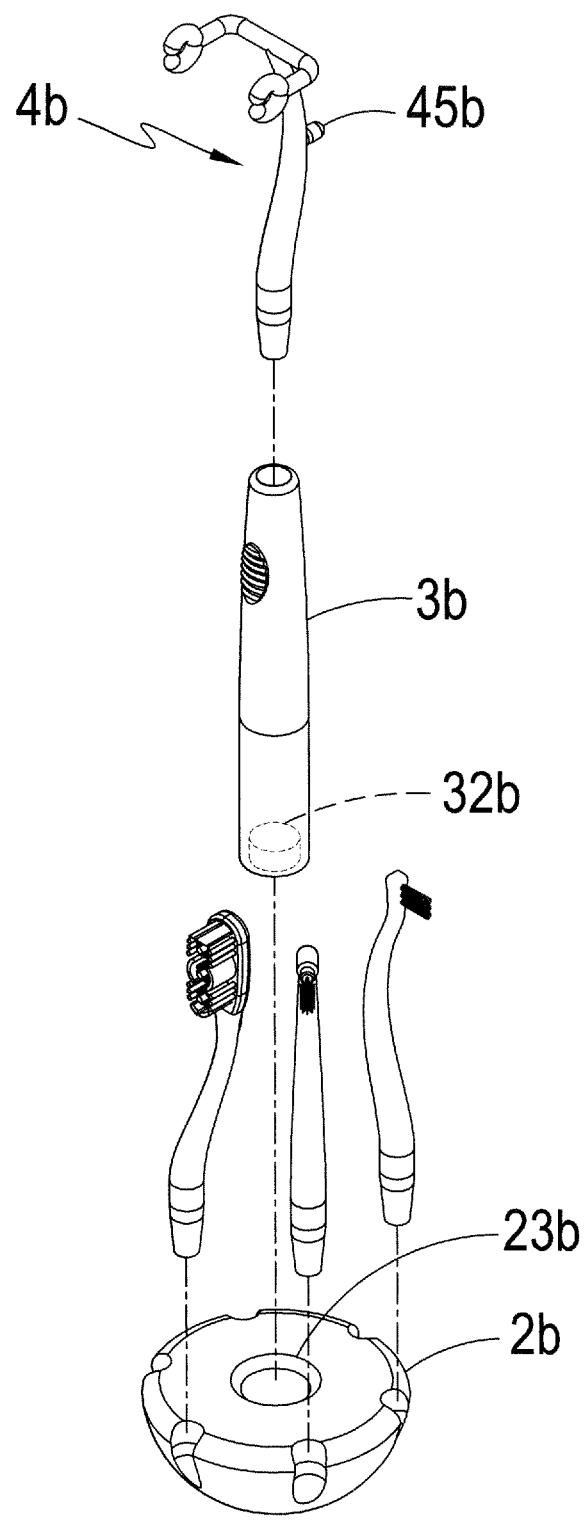
FIG. 10 is an exploded view showing a third embodiment of the present invention.
Figure 11:
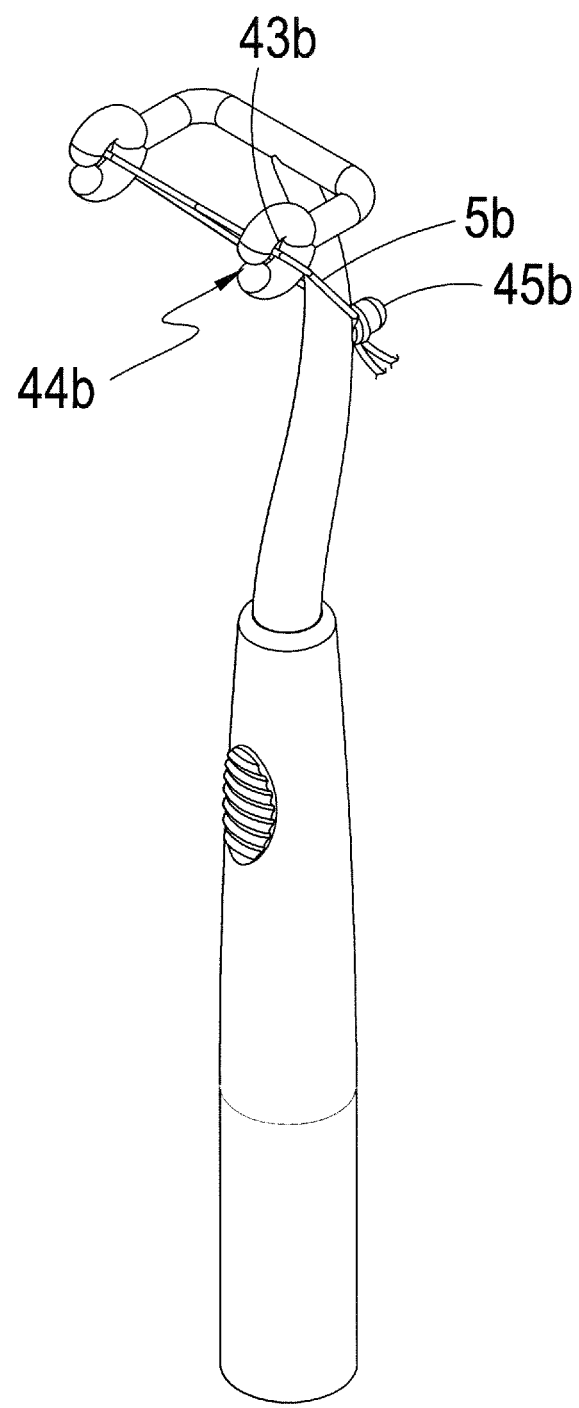
FIG. 11 is a schematic view demonstrating tightening of the third embodiment of the present invention.
Figure 11A:
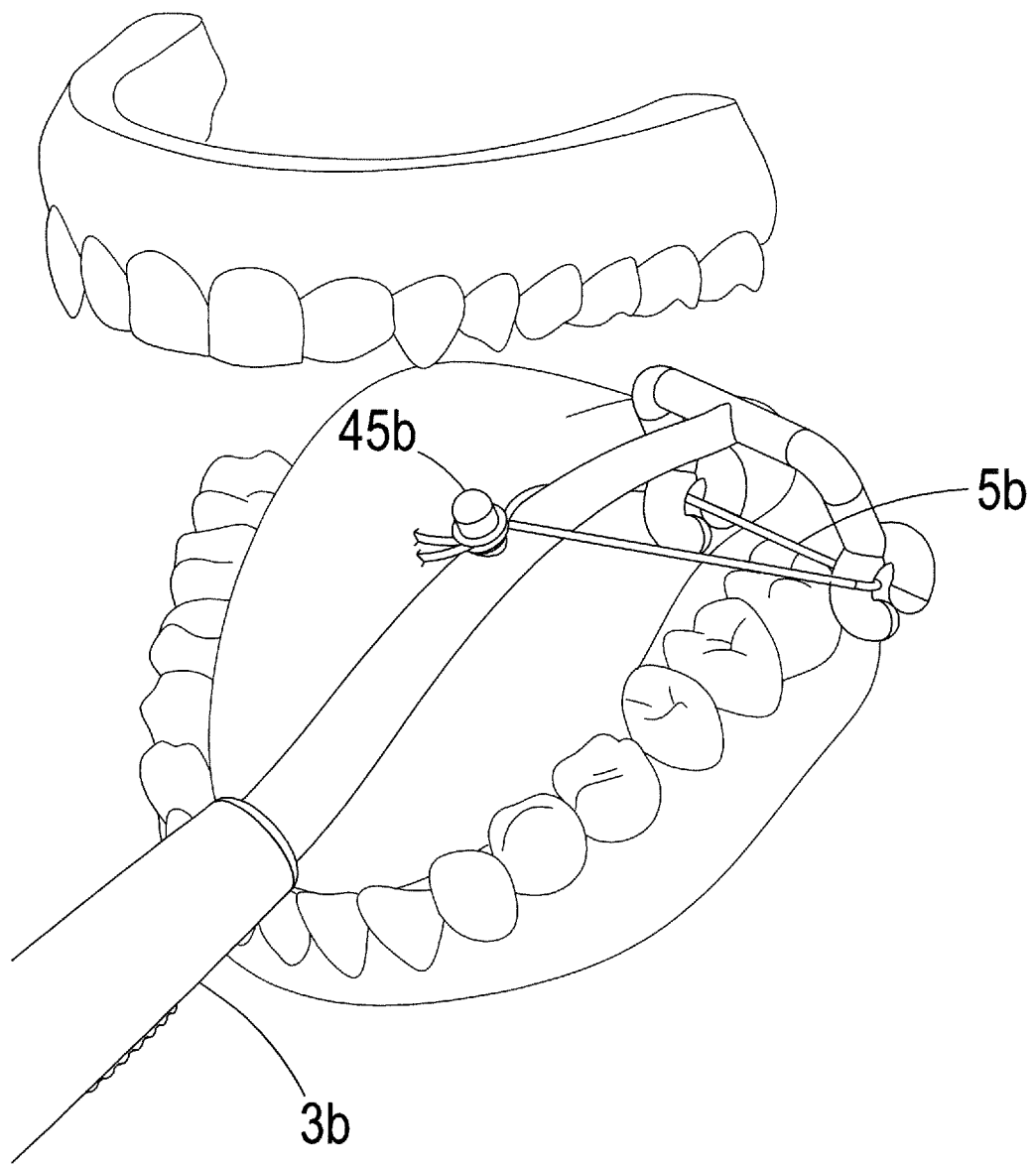
FIG. 11A is a schematic view demonstrating fitting of the third embodiment of the present invention.
Figure 12:
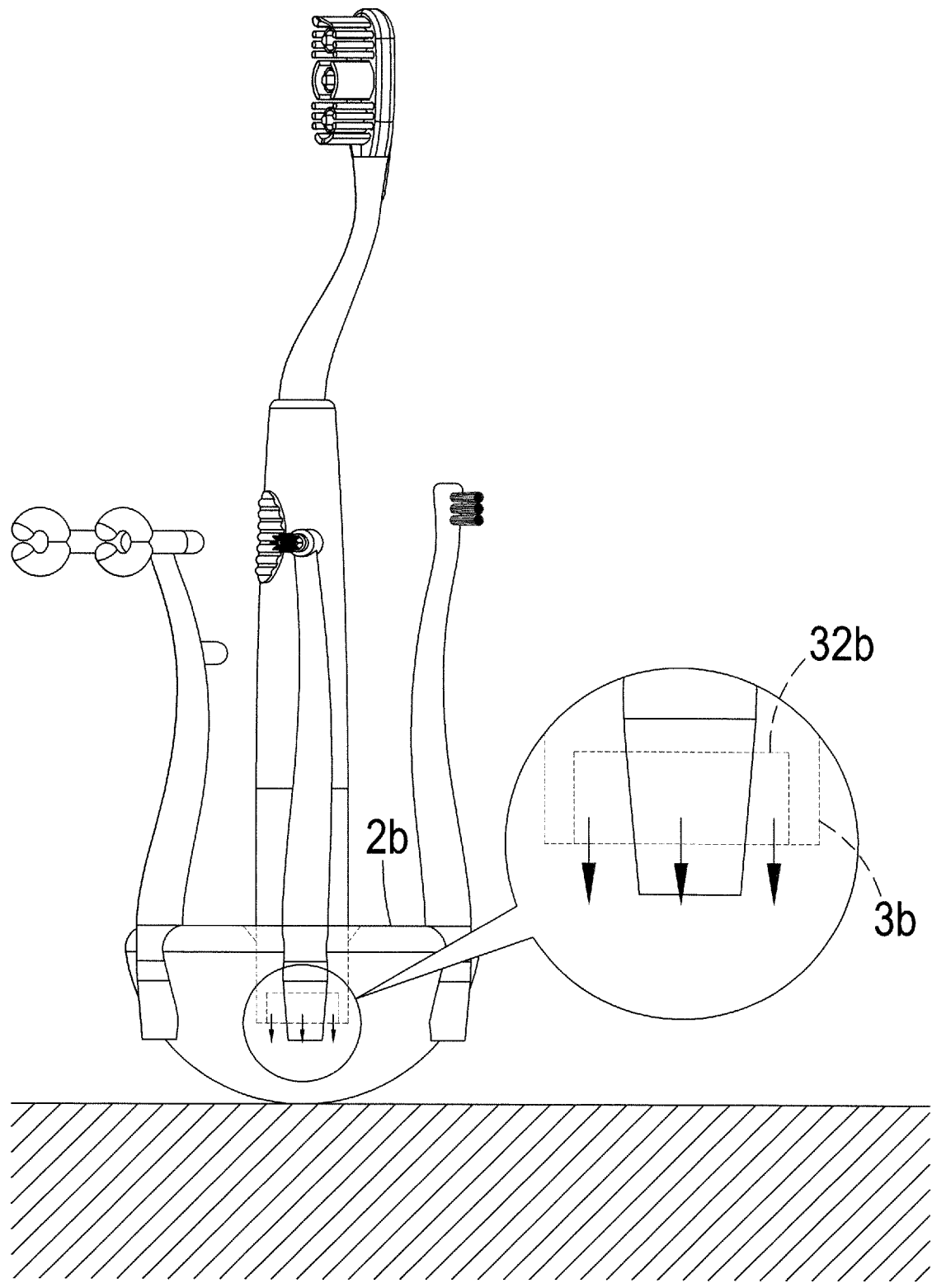
FIG. 12 is a schematic view demonstrating suction-attaching of the third embodiment of the present invention.
Figure 12A:
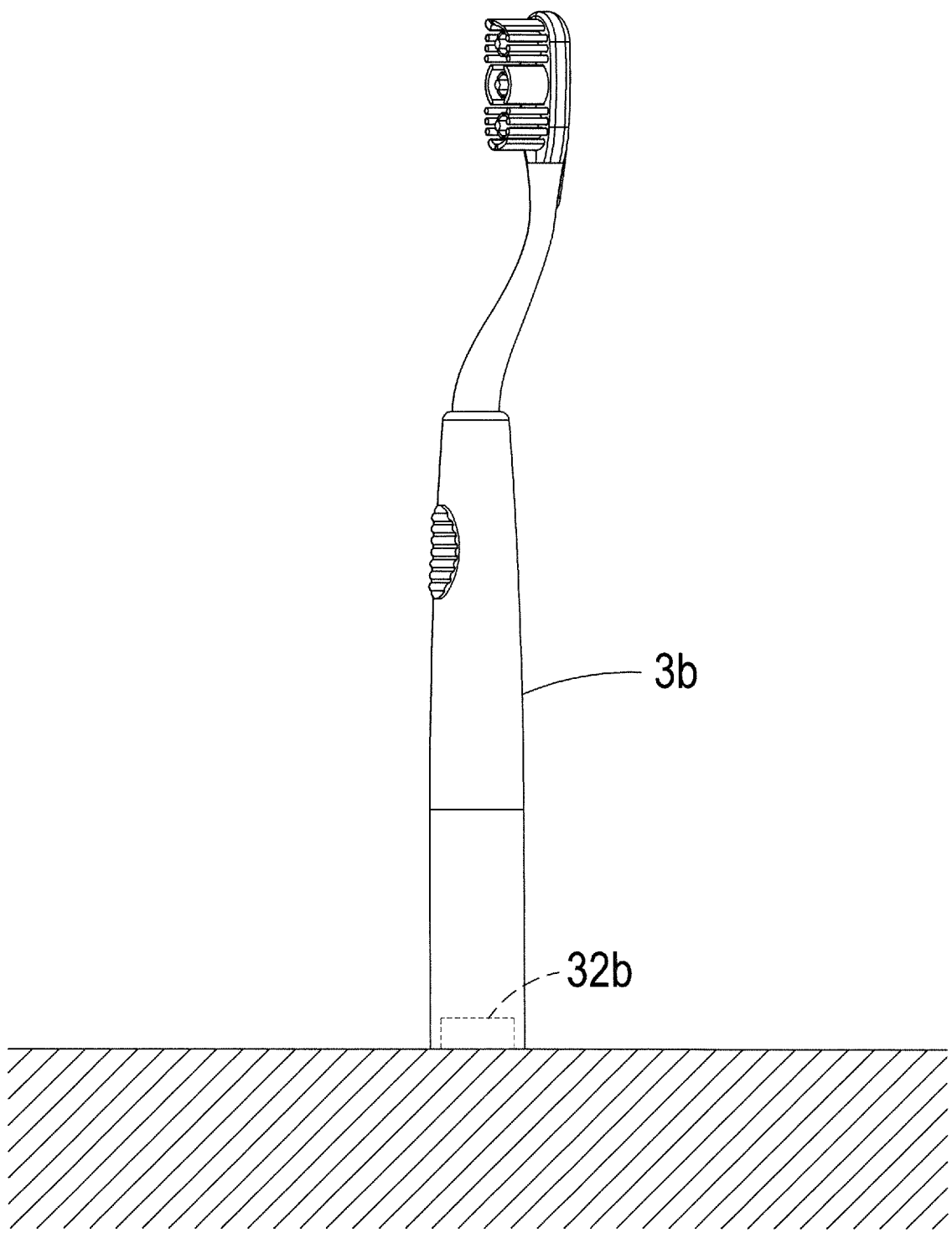
FIG. 12A is a schematic view demonstrating placing of the third embodiment of the present invention.

Referring further to FIGS. 10-12, which are respectively an exploded view showing a third embodiment of the present invention, a schematic view demonstrating tightening of the third embodiment of the present invention, a schematic view demonstrating fitting of the third embodiment of the present invention, and a schematic view demonstrating suction-attaching of the third embodiment of the present invention, it can be clearly seen from the drawings, the instant embodiment is generally similar to the previous embodiments, except that the hygiene piece $4b$ is provided with a floss fixing assisting section $45b$, wherein in the instant embodiment, the floss fixing assisting section $45b$ is a block that is raised and projecting outward to allow a user to have a piece of floss $5b$ inserted into the holed sections $43b$ and pulled the floss $5b$ to a tensioned condition for wrapping around the floss fixing assisting section $45b$ to provide a configuration just like a floss pick to easily fitting the floss $5b$ into the rear-side teeth, and subsequently, the floss $5b$ wrapped around the floss fixing assisting section $45b$ can be released to allow the floss $5b$ to detach from the holed sections $43b$ at the location of the detaching sections $44b$, so that a cleaning operation can be done with the floss $5b$. Further, when a user intends to remove the hygiene piece $4b$, the user may hold and grip the floss fixing assisting section $45b$ to help the operation of removal, and in this way, the efficiency and easiness of use can be enhanced.

Further, in the instant embodiment, the handle member $3b$ includes a magnetic attraction member $32b$, and such a magnetic attraction member $32b$ is illustrated, as an example, in the form of a magnet. The base member $2b$ is illustrated, as an example, a metallic base to which the magnet is magnetically attachable. In this way, the handle member $3b$ can be efficiently and fast positioned in the base engaging section $23b$ by means of the magnetic attraction member $32b$, and through a slight force applied, the handle member $3b$ can be pulled out and withdrawn. In this way, easiness of use is further enhanced.

Further, the handle member $3b$ has a bottom that is a flat surface. During use, a user may be interrupted and intends the place the handle member $3b$ on a table top in an upward erected condition. When the table top includes a metallic object, the magnetic attraction member $32b$ may help improve the stability of the erected condition to greatly improve easiness of use.

Figure 13:
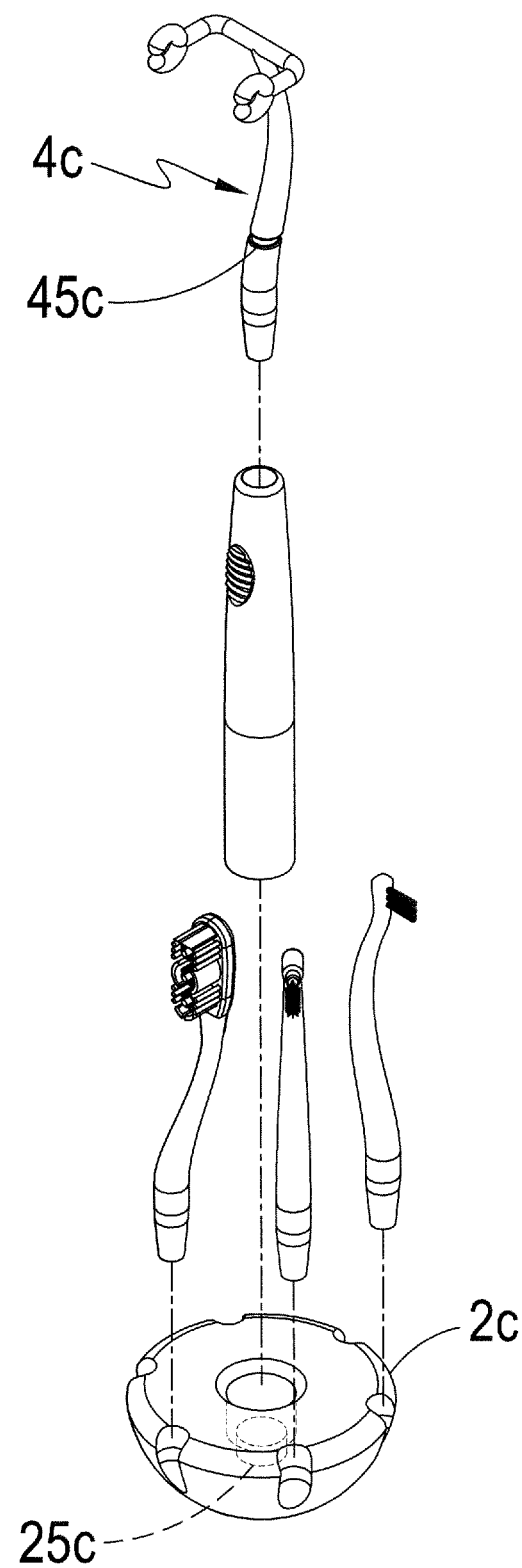
FIG. 13 is an exploded view showing a fourth embodiment of the present invention.
Figure 14:
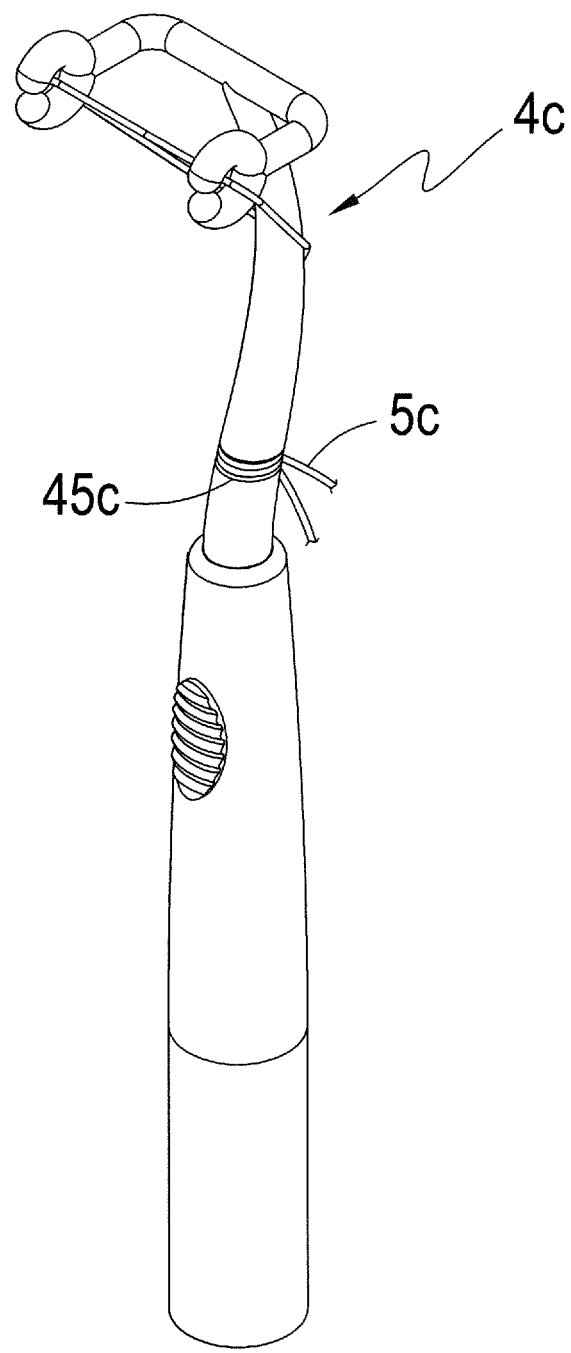
FIG. 14 is a schematic view demonstrating tightening of the fourth embodiment of the present invention.
Figure 15:
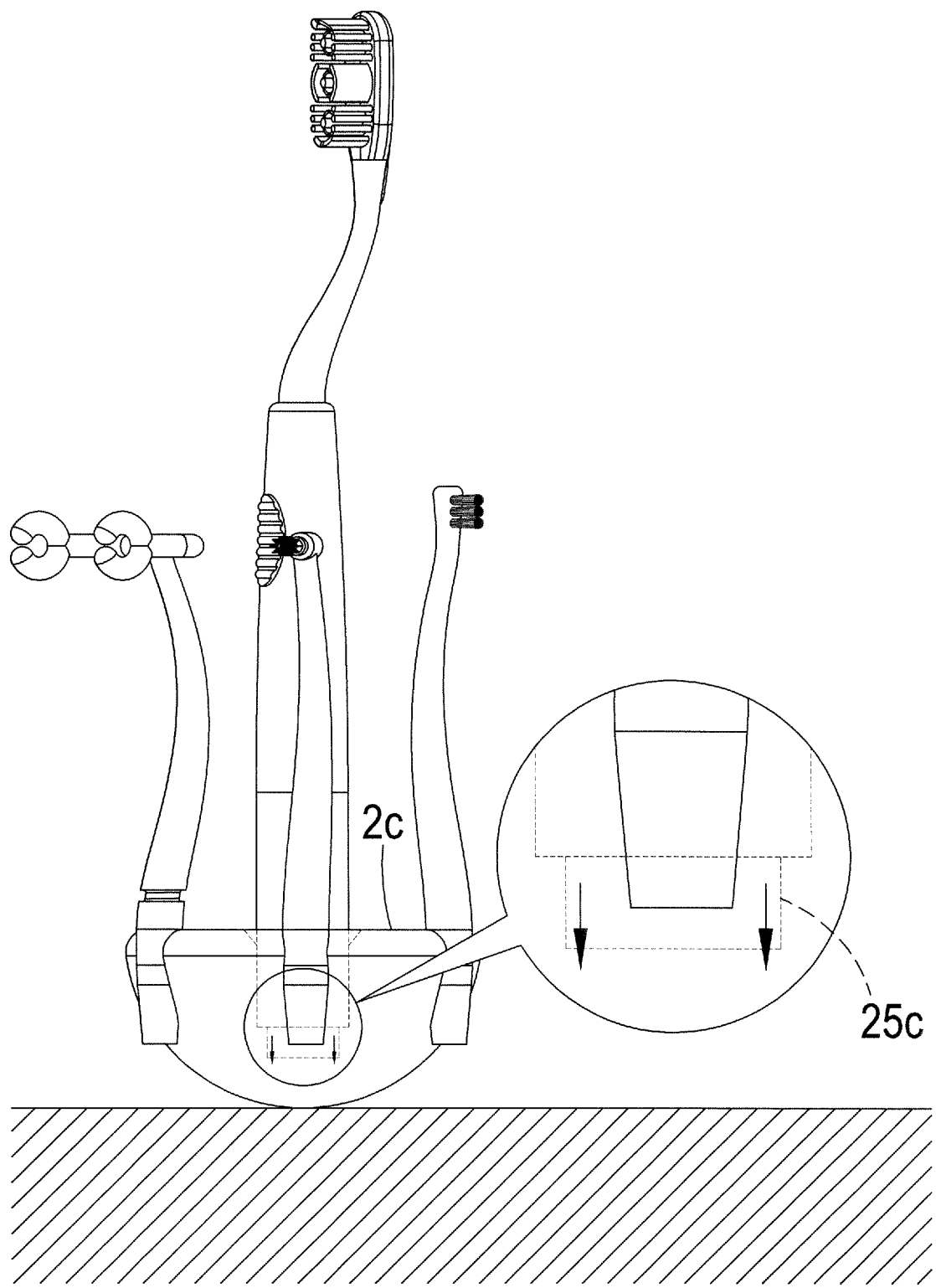
FIG. 15 is a schematic view demonstrating suction-attaching of the fourth embodiment of the present invention.

Referring further to FIGS. 13-15, which are respectively an exploded view showing a fourth embodiment of the present invention, a schematic view demonstrating tightening of the fourth embodiment of the present invention, and a schematic view demonstrating suction-attaching of the fourth embodiment of the present invention, it can be clearly seen from the drawings, the instant embodiment is generally similar to the previous embodiments, except that in the instant embodiment, the floss fixing assisting section $45c$ is illustrated, as an example, as a recess formed in the hygiene piece $4c$. This is provided to demonstrate that the configuration of the floss fixing assisting section $45c$ is not limited to any specific one. In this way, a user is still allowed to wrap a piece of floss $5c$ in and around the recess to set the floss $5c$ in a tensioned condition to achieve a configuration just like a floss pick. This helps improve the efficiency and easiness of use.

Further, in the instant embodiment, the base member $2c$ is provided with a magnetic attraction member $25c$, and such a magnetic attraction member $25c$ is illustrated, as an example, in the form of a magnet, this being also increasing the weight of the base member $2c$. When the base member $2c$ is positioned on a table top or an object that is made of a ferrous metal material, the magnetic attraction member $25c$ could make the base member $2c$ fixed in a more stable way and not easy to tip over.

Figure 16:
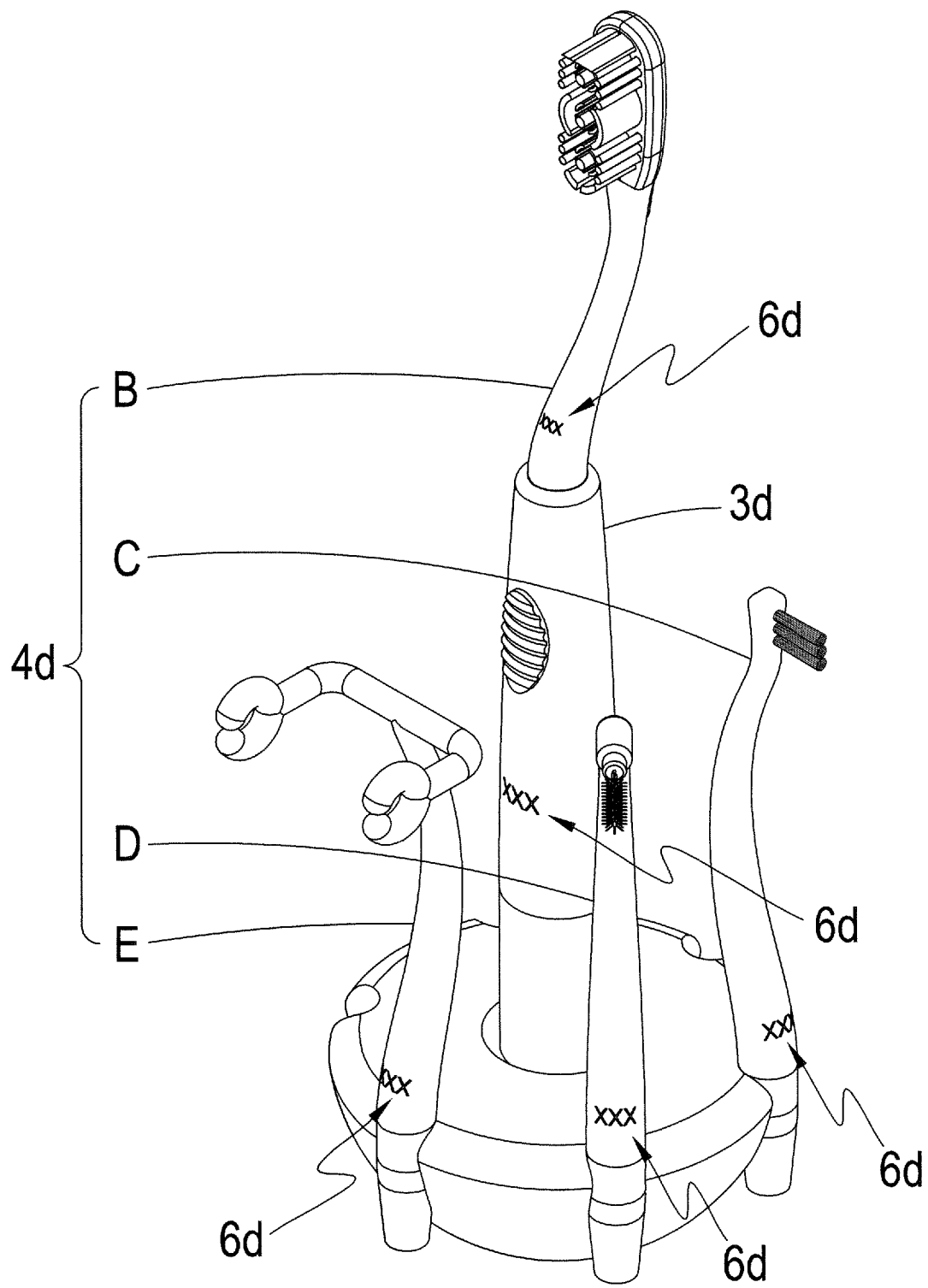
FIG. 16 is a perspective view showing a fifth embodiment the present invention.

Referring further to FIG. 16, which is a perspective view showing a fifth embodiment the present invention, it can be clearly seen from the drawing, the instant embodiment is generally similar to the previous embodiments, except that the handle member $3d$ and the hygiene pieces $4d$ are both provided with a character/figure pattern section $6d$ to provide various types of sign or marking, wherein the character/figure pattern section $6d$ on the handle member $3d$ can be a comforting pattern or encouraging texts, so that for every use, the user may feel mentally comforted and may be encouraged for repeated use to enhance the effect of cleaning the oral cavity.

The character/figure pattern section $6d$ provided on the hygiene pieces $4d$ may be used to identify the names of the family members so that each individual family member may share the same one handle member $3d$, which is used in combination with different hygiene pieces $4d$ to handle various cleaning conditions of different family members. Further, with the provision of the character/figure pattern section $6d$, erroneous use of the hygiene pieces $4d$ by picking an incorrect one by a different family member. For example, a child may use the hard-bristle toothbrush B; the mother uses the floss insertion assisting device E, and the father uses the interdental brush D and the single-cluster toothbrush C. In this way, it only needs to purchase one single handle member $3d$ for separate use with different ones of the hygiene pieces $4d$, to suit the needs of the whole family, and as such, an advantage of cost saving can be achieved.

Figure 17:
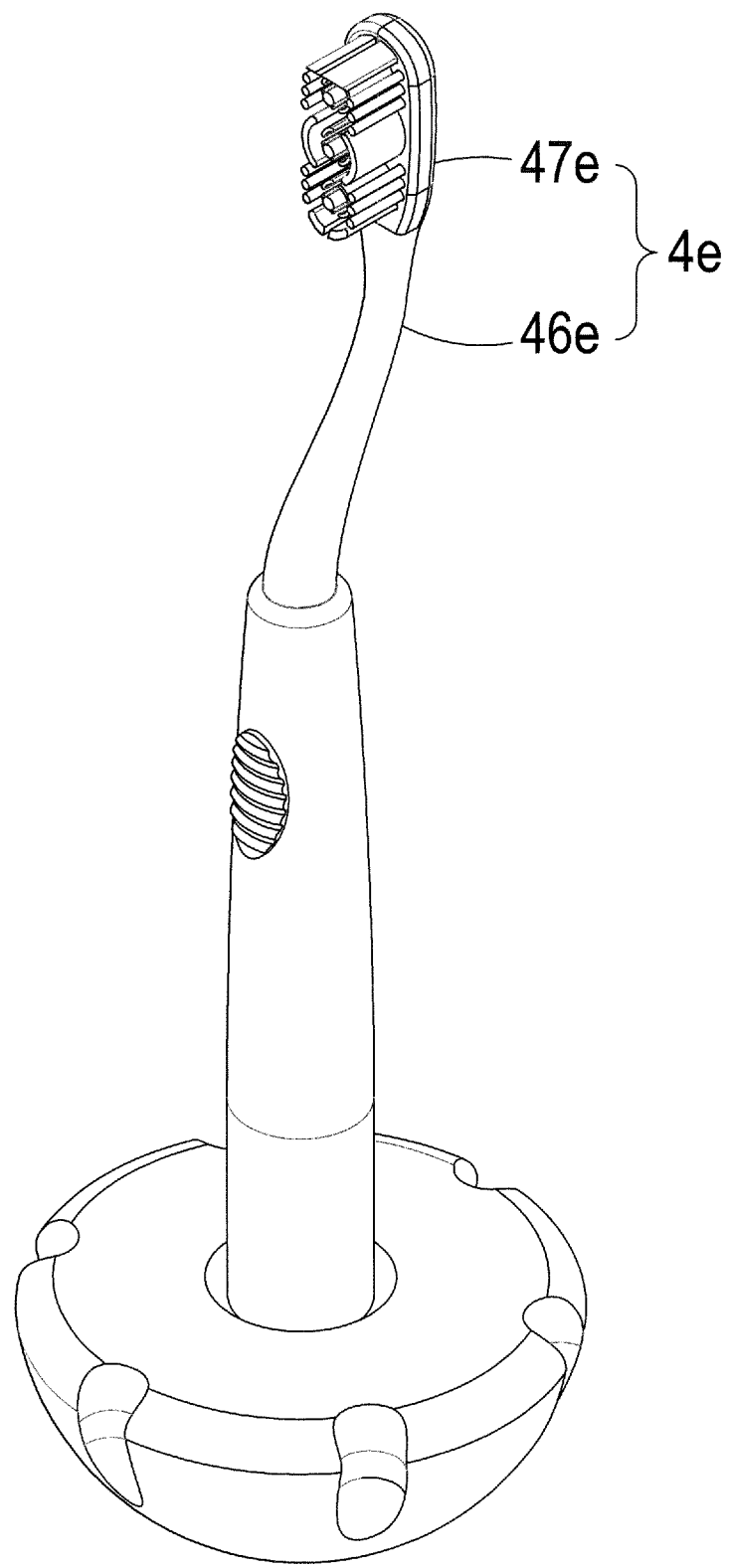
FIG. 17 is a perspective view showing a sixth embodiment the present invention.
Figure 18:
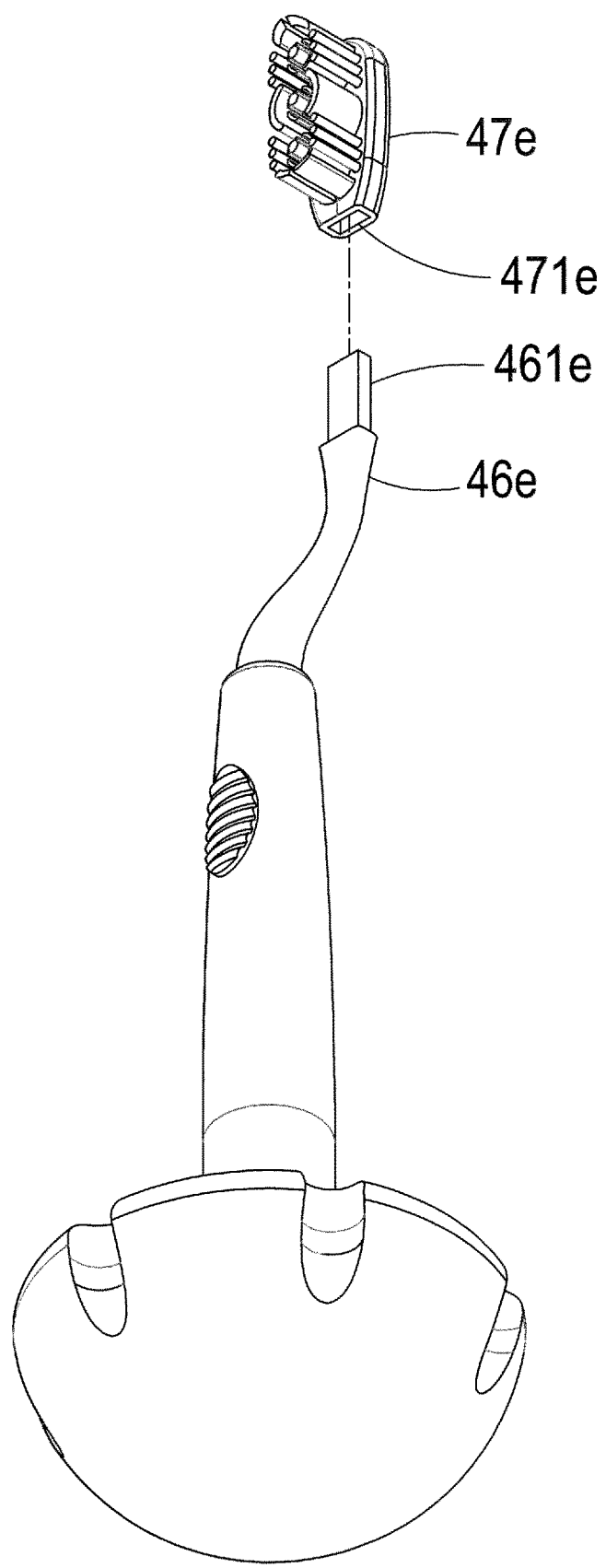
FIG. 18 is an exploded view showing the sixth embodiment of the present invention.

Referring further to FIGS. 17 and 18, which are a perspective view and an exploded view showing a sixth embodiment the present invention, it can be clearly seen from the drawings, the instant embodiment is generally similar to the previous embodiments. In the instant embodiment, the hygiene piece 4e includes a cleaning bar 46e and a cleaning section 47e detachably coupled to the cleaning bar 46e. This allows a user to individually replace the cleaning section 47e only, and the part that is replaceable can be greatly reduced to thereby greatly reduce the amount of waste to be disposed of and greatly enhancing the effect of environmental protection. Further, in the instant embodiment, the cleaning section 47e is formed with a sliding channel 471e, and the cleaning bar 46e is provided with a block 461e insertable into the sliding channel 471e, this being provided as an example of coupling or combination between the two, but not limited thereto.

Figure 19:
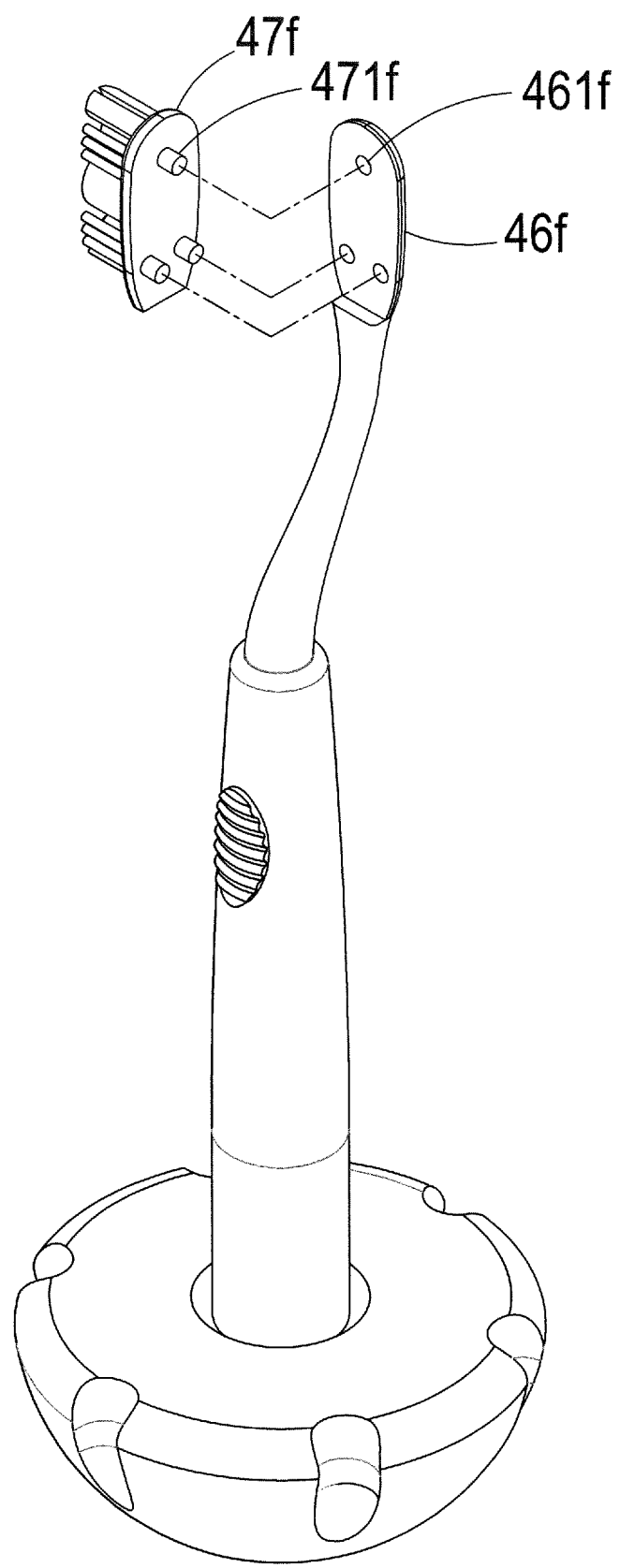
FIG. 19 is an exploded view showing a seventh embodiment of the present invention.

Referring further to FIG. 19, which is an exploded view showing a seventh embodiment of the present invention, it can be clearly seen from the drawing, the instant embodiment is generally similar to the previous embodiments, in the instant embodiment, the cleaning section 47f includes a plurality of mutual engaging blocks 471f, and the cleaning bar 46f includes a plurality of recesses 461f into which the mutual engaging blocks 471f may be respectively inserted. This illustrates that through mutual engaging, the cleaning section 47f may be mounted to the cleaning bar 46f. This is provided to demonstrate the coupling or combination of the cleaning section 47f and the cleaning bar 46f is not limited to any specific form.

Figure 20:
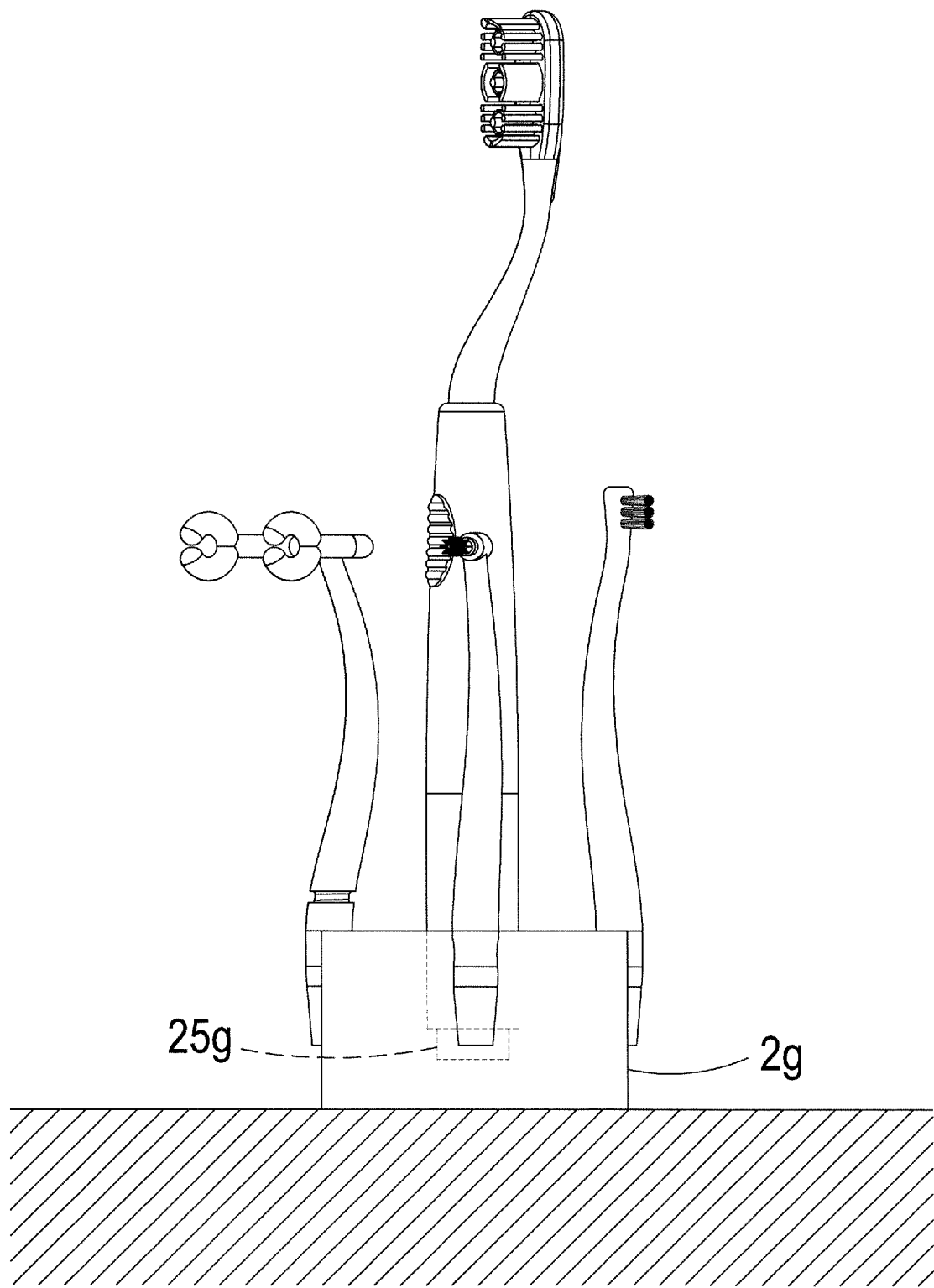
FIG. 20 is a perspective view showing an eighth embodiment the present invention.

Referring further to FIG. 20, which is a perspective view showing an eighth embodiment the present invention, it can be clearly seen from the drawing, the instant embodiment is generally similar to the previous embodiments, in the instant embodiment, the base member 2g is illustrated, as an example, in the form of a rectangular or square base. This is provided to demonstrate that the configuration of the base member 2g is not limited to any specific one and can be of any base that allows for placing and can be enhanced in respect of an overall fixing effect by means of magnetic attraction achieved with the magnetic attraction member 25g.

I claim:

1. An anti-tipping exchanging structure of an oral hygiene instrument, the oral hygiene instrument comprising:

a handle member;

a base member, the base member comprising a weight element, a circular curved section, and a base engaging section, the circular curved section being formed on one side of the weight element, the base engaging section being formed on one side of the weight element that is opposite to the circular curved section, the base engaging section engageable and combinable with an end of the handle member;

a handle engaging portion, the handle engaging portion being provided on the handle member; and a hygiene piece, the hygiene piece being provided with a mutual engaging section that allows the hygiene piece to be set in engagement with and mounted to the handle engaging portion through the mutual engaging section by means of tight fitting therebetween, the hygiene piece including a first rod, a plurality of holed sections, and a plurality of detaching sections, the holed sections being formed on the first rod, the first rod comprising a curved portion to which the holed sections are connected, the detaching sections being formed in a side wall of the holed sections, wherein each of the plurality of holed sections includes a circular hole and the side wall includes a circumferential wall circumferentially extending around the circular hole, and each of the plurality of detaching sections includes an opening formed in the circumferential wall of the circular hole, and wherein the plurality of holed sections are arranged such that the circular holes of the plurality of holed sections have centers that are in alignment with each other along a common central axis and the openings of the plurality of detaching sections are in alignment with each other in a direction parallel with the common central axis.

2. The anti-tipping exchanging structure of the oral hygiene instrument according to claim 1, wherein the oral hygiene instrument is provided with at least one magnetic attraction member.

3. The anti-tipping exchanging structure of the oral hygiene instrument according to claim 1, wherein the base member comprises a plurality of placing sections to receive the hygiene piece to be positioned therein.

4. The anti-tipping exchanging structure of the oral hygiene instrument according to claim 1, wherein the hygiene piece is provided with at least one floss fixing assisting section.

* * * * *